United States Patent
Nakamura

(10) Patent No.: US 8,140,988 B2
(45) Date of Patent: Mar. 20, 2012

(54) CAD APPARATUS, METHOD OF EDITING GRAPHIC DATA, AND COMPUTER PRODUCT

(75) Inventor: Takeo Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 655 days.

(21) Appl. No.: 11/905,318

(22) Filed: Sep. 28, 2007

(65) Prior Publication Data

US 2008/0134066 A1  Jun. 5, 2008

(30) Foreign Application Priority Data

Dec. 5, 2006  (JP) .................................. 2006-328119

(51) Int. Cl.
*G02F 3/14*   (2006.01)
*G02F 3/17*   (2006.01)

(52) U.S. Cl. .......... 715/764; 715/839; 705/26; 702/167; 702/186; 345/98; 345/419; 345/473; 700/97; 703/2

(58) Field of Classification Search .......... 715/200–277, 715/839; 700/701–866; 709/201–229; 705/50–79, 705/26; 345/30–111, 419, 473, 440; 702/167, 702/186

See application file for complete search history.

(56) References Cited

U.S. PATENT DOCUMENTS

| | | | | |
|---|---|---|---|---|
| 6,166,738 A * | 12/2000 | Robertson et al. | ............. | 715/839 |
| 6,414,677 B1 * | 7/2002 | Robertson et al. | ............. | 345/419 |
| 7,027,055 B2 * | 4/2006 | Anderson et al. | ............. | 345/473 |
| 7,085,683 B2 * | 8/2006 | Anderson et al. | ............. | 702/186 |
| 7,250,944 B2 * | 7/2007 | Anderson et al. | ............. | 345/419 |
| 7,483,025 B2 * | 1/2009 | Roy et al. | ............. | 345/440 |
| 7,676,348 B2 * | 3/2010 | Okada | ............. | 703/2 |
| 2002/0099461 A1 * | 7/2002 | Anami et al. | ............. | 700/97 |
| 2004/0204903 A1 * | 10/2004 | Saebi | ............. | 702/167 |
| 2007/0252804 A1 * | 11/2007 | Engel et al. | ............. | 345/98 |
| 2008/0167971 A1 * | 7/2008 | Lopez et al. | ............. | 705/26 |

FOREIGN PATENT DOCUMENTS

| | | |
|---|---|---|
| JP | 02-240771 | 9/1990 |
| JP | 05-006400 | 1/1993 |
| JP | 07-049893 | 2/1995 |
| JP | 07-105353 | 4/1995 |
| JP | 07-253999 | 10/1995 |
| JP | 08-22490 | 1/1996 |
| JP | 08-115435 | 5/1996 |
| JP | 08-185416 | 7/1996 |
| JP | 09-101982 | 4/1997 |
| JP | 10-301972 | 11/1998 |

(Continued)

OTHER PUBLICATIONS

Frank Baeseler, "Adobe Pagemaker 7.0 Classroom in a Book [das offizielle Übungsbuch]", 2002, Adobe Press, Martin-Kollar-Str. 10-12 Munich, Germany, XP002461419, pp. 142-144.

(Continued)

*Primary Examiner* — Ruay Ho
(74) *Attorney, Agent, or Firm* — Fujitsu Patent Center

(57) ABSTRACT

A CAD apparatus, a CAD method and a computer-readable recording medium storing a CAD program, configured to display and edit graphic data including a plurality of layers, and to display information about a layer to which the element belongs, so that a user can easily find for what use the element belongs to the layer in use, thereby being able to perform required editing work immediately.

18 Claims, 27 Drawing Sheets

FOREIGN PATENT DOCUMENTS

| | | |
|---|---|---|
| JP | 11-53415 | 2/1999 |
| JP | 11-306210 | 11/1999 |
| JP | 2002-149651 | 5/2002 |
| JP | 2002-245108 A | 8/2002 |
| JP | 2004-046396 | 2/2004 |
| JP | 2005-157442 | 6/2005 |

OTHER PUBLICATIONS

"Tooltip", Wikipedia, The Free Encyclopedia, [Online], Oct. 20, 2006, XP002462584 [retrieved on Dec. 17, 2007].

International Business Machines Corporation: "Secondary help available from text of common tooltip", Research Disclosure, Mason Publications, Hampshire, GB, vol. 447, No. 145, Jul. 2001, XP007128646.

Extended European Search Report, mailed Jan. 18, 2008 and issued in corresponding European Patent Application No. 007117441.1-2224.

Japanese Office Action mailed Nov. 8, 2011 for corresponding Japanese Application No. 2006-328119, with English-language translation.

Japanese Office Action mailed Jul. 12, 2011 for corresponding Japanese Application No. 2006-328119, with partial English-language translation.

* cited by examiner

FIG.6

| LAYER NUMBER | LAYER NAME | COMMENT | EFFECTIVENESS FLAG | DISPLAY FLAG | EDIT FLAG |
|---|---|---|---|---|---|
| S1 | CIRCUIT DIAGRAM | ALL ELEMENTS IN CIRCUIT DIAGRAM | 1 | 1 | 1 |
| S2 | DRAWING FRAME/TITLE | FRAME OF DRAWING AND FIELD FOR TITLE | 1 | 1 | 0 |
| S3 | DRC RESULT | CONTENT OF DRC ERROR | 1 | 0 | 0 |
| S4 | COMMENT | DISPLAYING COMMENT | 1 | 1 | 0 |
| U1 | REVIEW RESULT | COMMENT ON REVIEW MEETING, ETC. | 1 | 1 | 0 |
| U2 | PARTS ARRANGEMENT REQUIREMENT (1) | PARTS ARRANGEMENT REQUIREMENT IN FIRST PRIORITY | 1 | 1 | 1 |
| U3 | PARTS ARRANGEMENT REQUIREMENT (2) | PARTS ARRANGEMENT REQUIREMENT IN SECOND PRIORITY | 1 | 1 | 1 |
| U4 | PACKAGING SIDE REPORT | REPORT MATTER FOR PACKAGING DESIGN | 1 | 0 | 0 |
| U5 | – | – | 0 | 0 | 0 |
| C1 | FOR INTERNAL USE ONLY | DESCRIPTION OF "FOR INTERNAL USE ONLY" | 1 | 1 | 0 |
| ... | ... | ... | ... | ... | ... |

141a

FIG.7
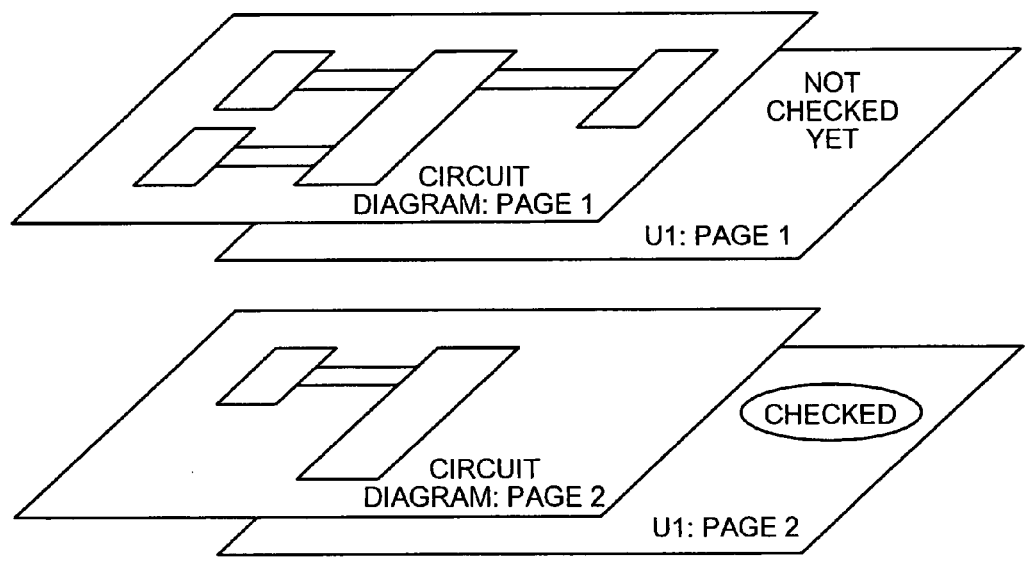
FIG.8
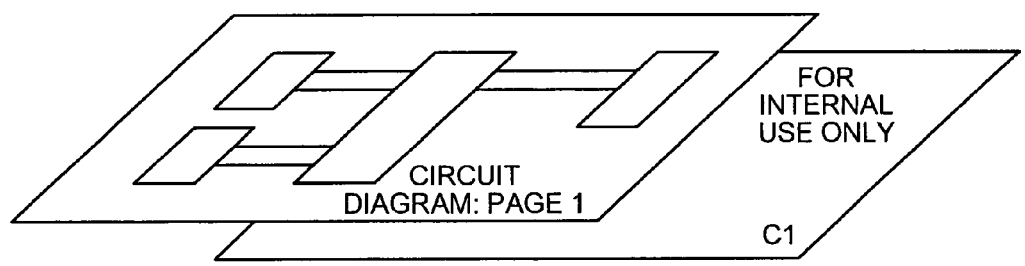
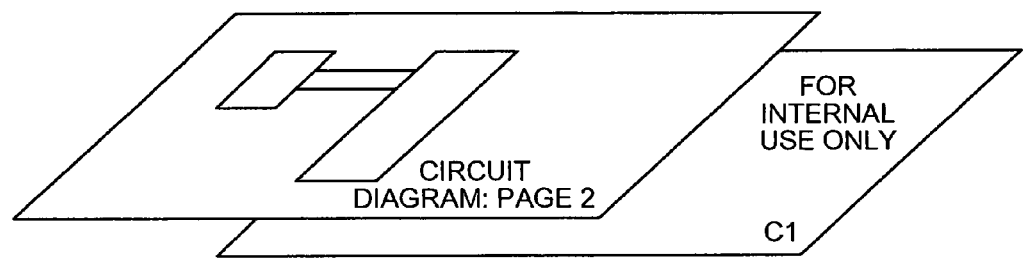

FIG.14

| LAYER CONTROL | | ✕ |
|---|---|---|
| LAYER NAME | DISPLAY | EDIT |
| S1 CIRCUIT DIAGRAM | ✓ | ✓ |
| S2 DRAWING FRAME/ TITLE | ✓ | ☐ |
| S3 DRC RESULT | ☐ | ☐ |
| S4 COMMENT | ✓ | ☐ |
| U1 REVIEW RESULT | ✓ | ☐ |
| U2 PARTS ARRANGEMENT REQUIREMENT (1) | ✓ | ✓ |
| U3 PARTS ARRANGEMENT REQUIREMENT (2) | ✓ | ✓ |
| U4 PACKAGING SIDE REPORT | ☐ | ☐ |
| C1 FOR INTERNAL USE ONLY | ✓ | ☐ |
| ... | ... | |

| ↑ UP | ↓ DOWN | PREDETERMINED ORDER |

CAD APPARATUS, METHOD OF EDITING GRAPHIC DATA, AND COMPUTER PRODUCT

BACKGROUND OF THE INVENTION

1. Field of the Invention

The present invention generally relates to a technology for computer-aided designing (CAD). The present invention particularly relates to editing graphic data including a plurality of layers.

2. Description of the Related Art

CAD apparatuses have been widely used for improving efficiency of designing work. Moreover, the graphic data created with the CAD apparatuses are used in downstream operations, such as manufacturing processes, thereby further improving the efficiency. In CAD, one drawing is sometimes created by dividing it into a plurality of layers.

For example, Japanese Patent Application Laid-open No. H9-101982 discloses a technique of dividing one drawing into a layer including common portions and a layer including non-common portions. On the other hand, Japanese Patent Application Laid-open No. 2004-46396 discloses a technological idea that facilitates maintenance of graphic data by inputting drawing frame information, building frame information, parts information, and dimension information into separate layers.

However, because CAD apparatuses disclosed in Japanese Patent Application Laid-open Nos. H9-101982 and 2004-46396 enable a designer to edit graphic data by simply dividing the graphic data into layers, there is a possibility that the designer's operations to edit graphic data may turn complicated and worse for working efficiency.

In addition, a use of each layer cannot be defined quantitatively, so that the way of using a layer varies from designer to designer. If a third person modifies the graphic data, or if the graphic data is used in downstream operations, there is a possibility that a problem may arise.

SUMMARY OF THE INVENTION

It is an object of the present invention to at least partially solve the problems in the conventional technology.

According to an aspect of the present invention, a CAD apparatus configured to display and edit graphic data including a plurality of layers includes a display unit having a display screen and configured to display elements included in each of layers of the graphic data in a superposed manner on a display screen; an input unit that at least receives an instruction about movement of a pointer indicating a position on the display screen; and a control unit that provides a control to display at the position of the pointer on the display screen information about a layer to which the element belongs.

According to another aspect of the present invention, a method of displaying and editing graphic data including a plurality of layers includes displaying elements included in each of layers of the graphic data in a superposed manner on a display screen of a display unit; receiving an instruction about movement of a pointer indicating a position on the display screen; and providing a control to display at the position of the pointer on the display screen information about a layer to which the element belongs.

According to still another aspect of the present invention, a computer-readable recording medium stores therein a computer program that causes a computer to implement the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a schematic diagram of an example of contents of a layer management table;

FIG. 7 is a schematic diagram of an example of individual page layers;

FIG. 8 is a schematic diagram of an example of common layers;

FIG. 14 is a schematic diagram of a screen example of a layer control screen;

DETAILED DESCRIPTION OF THE PREFERRED EMBODIMENTS

Exemplary embodiments according to the present invention are explained below in detail with reference to the accompanying drawings. In the following embodiments, the present invention is explained in an example of a CAD apparatus for an electric system; however, the present invention is effective for CAD apparatuses for various applications as well as the CAD apparatus for an electric system.

Figure 1:
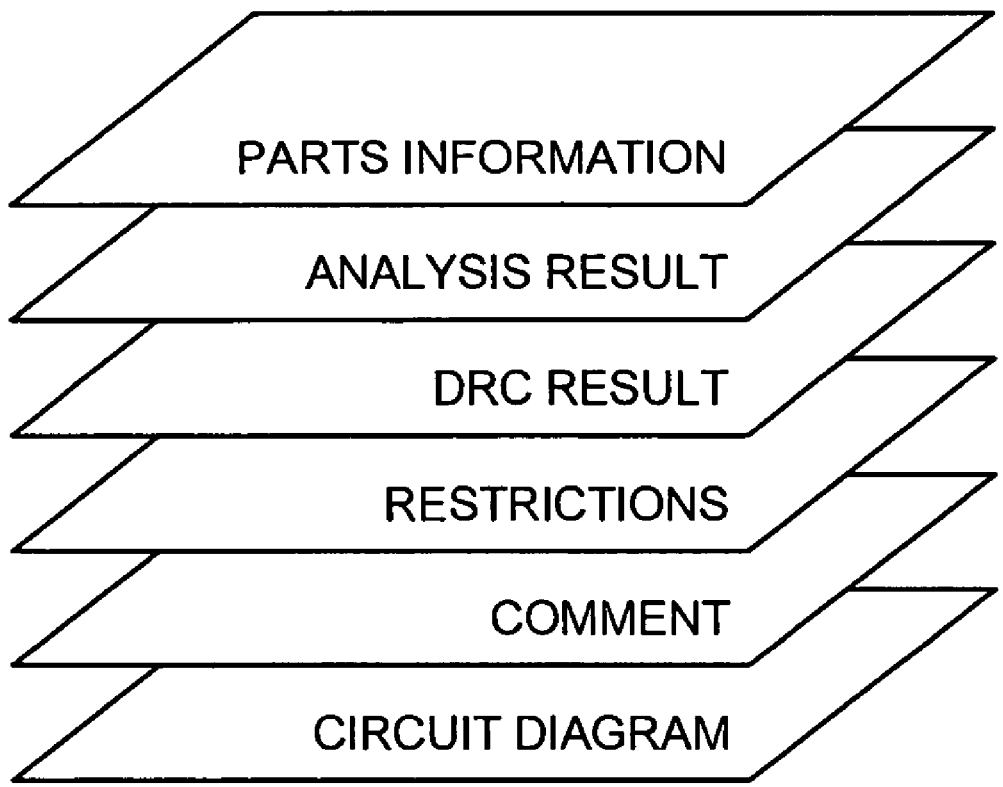
FIG. 1 is a conceptual schematic diagram of graphic data including a plurality of layers.

Graphic data used in a CAD apparatus according to an embodiment includes a plurality of layers as shown in FIG. 1. Specifically, the graphic data includes a layer that includes a circuit diagram that is basic to a drawing of an electric system, a layer that includes various comments about the circuit diagram, a layer that includes various restrictions for designing the circuit diagram, a layer that includes a result of Design Rule Check (DRC), a layer that includes an analysis result obtained by a simulator, a layer that includes information about specifications of parts, and the like.

Figure 2:
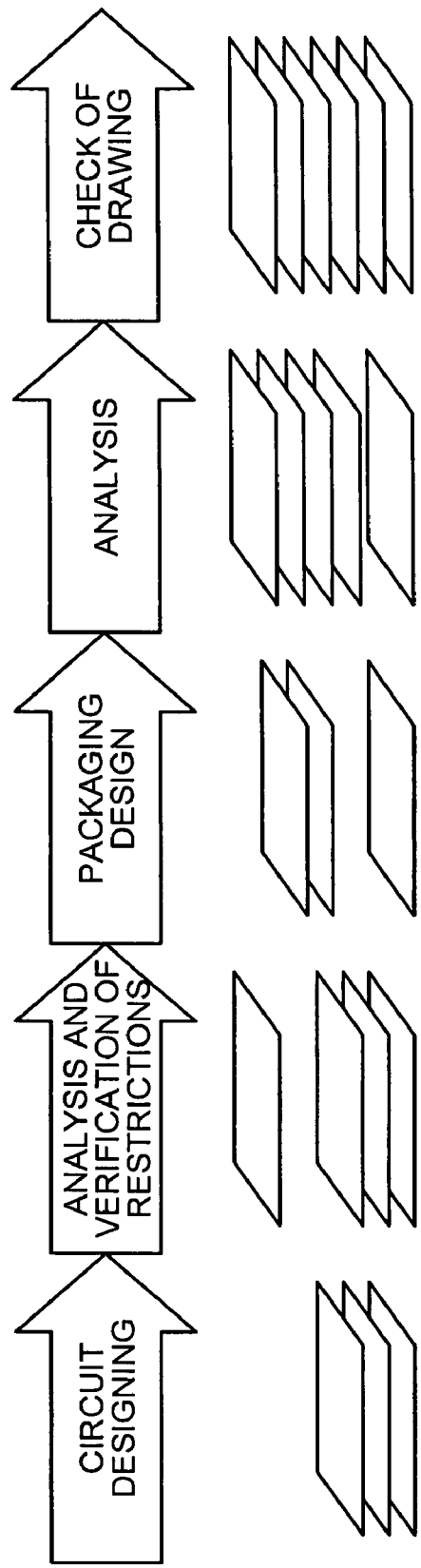
FIG. 2 is a schematic diagram of an example of display and output of graphic data appropriate to a phase and a purpose.

As shown in FIG. 2, display or non-display of each of the layers of the graphic data is switched in accordance with a development phase and a purpose of use, so that only required layers are displayed in a superposed manner. When designing a circuit, for example, the layer of restrictions is displayed in a superposed manner with the layer of the circuit diagram. When analyzing restrictions, for example, the layer of the analysis result is displayed in a superposed manner with the layer of the circuit diagram.

Figure 3:
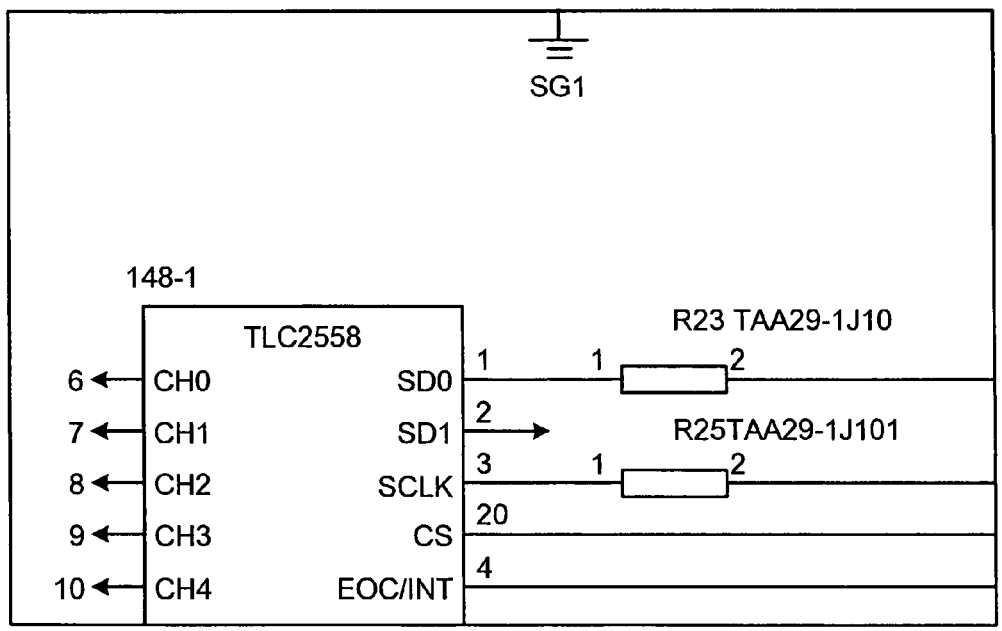
FIG. 3 is a schematic diagram of an example of displaying only a circuit diagram.
Figure 4:
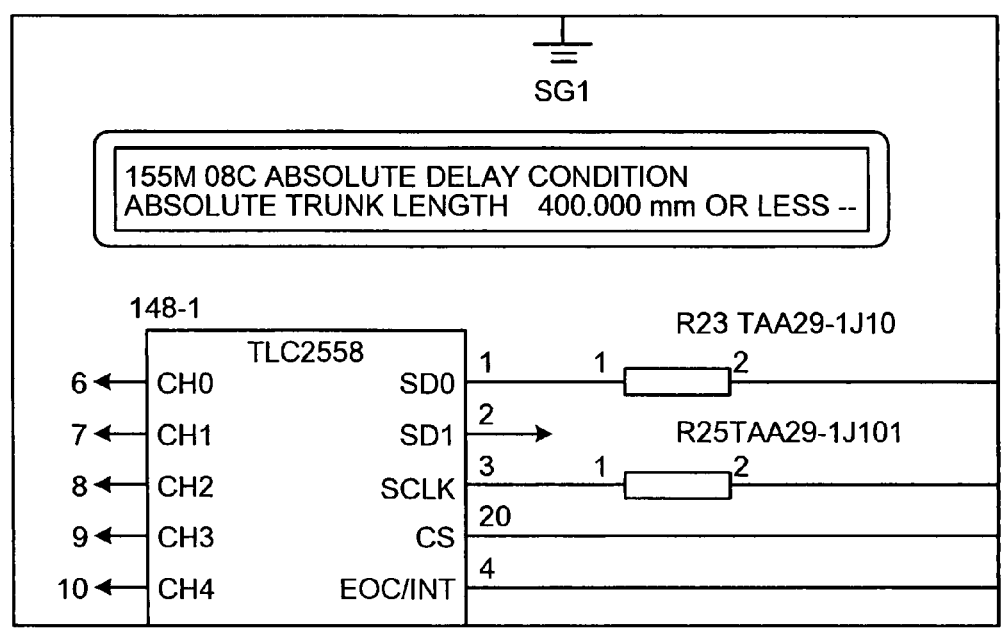
FIG. 4 is a schematic diagram of an example of displaying the circuit diagram and restrictions in superposed layers.

FIG. 3 is a schematic diagram presenting a state of display of only a layer of a circuit diagram, and FIG. 4 is a schematic diagram presenting a state of display of a layer of a circuit diagram and a layer of restrictions in a superposed manner. As shown in FIG. 4, if the restrictions or the analysis result are displayed as superposed on the circuit diagram, the restrictions or the analysis result are arranged on each layer to be displayed adjacent to a corresponding part.

Conventional CAD apparatuses are developed to display or edit basically the circuit diagrams. In other words, because the conventional CAD apparatuses are not developed to display or edit the DRC results or other information, the DRC results or other information is generally displayed or edited by using other devices such as word processors. Because the circuit diagrams and supplemental information related to the circuit diagram is processed separately, electronic data of the circuit diagram and supplemental information related to the circuit diagram are managed separately. Because of such separate management of data/information, sometimes the supplemental information is not renewed in accordance with a design revision in the circuit diagram, and sometimes the location of the supplemental information is lost.

The CAD apparatus according to the embodiment stores relevant supplemental information as a layer in the same electronic data of the circuit diagram. Accordingly, consolidated management of the circuit diagram and the supplemental information becomes possible, thereby solving the above problems.

Figure 5:
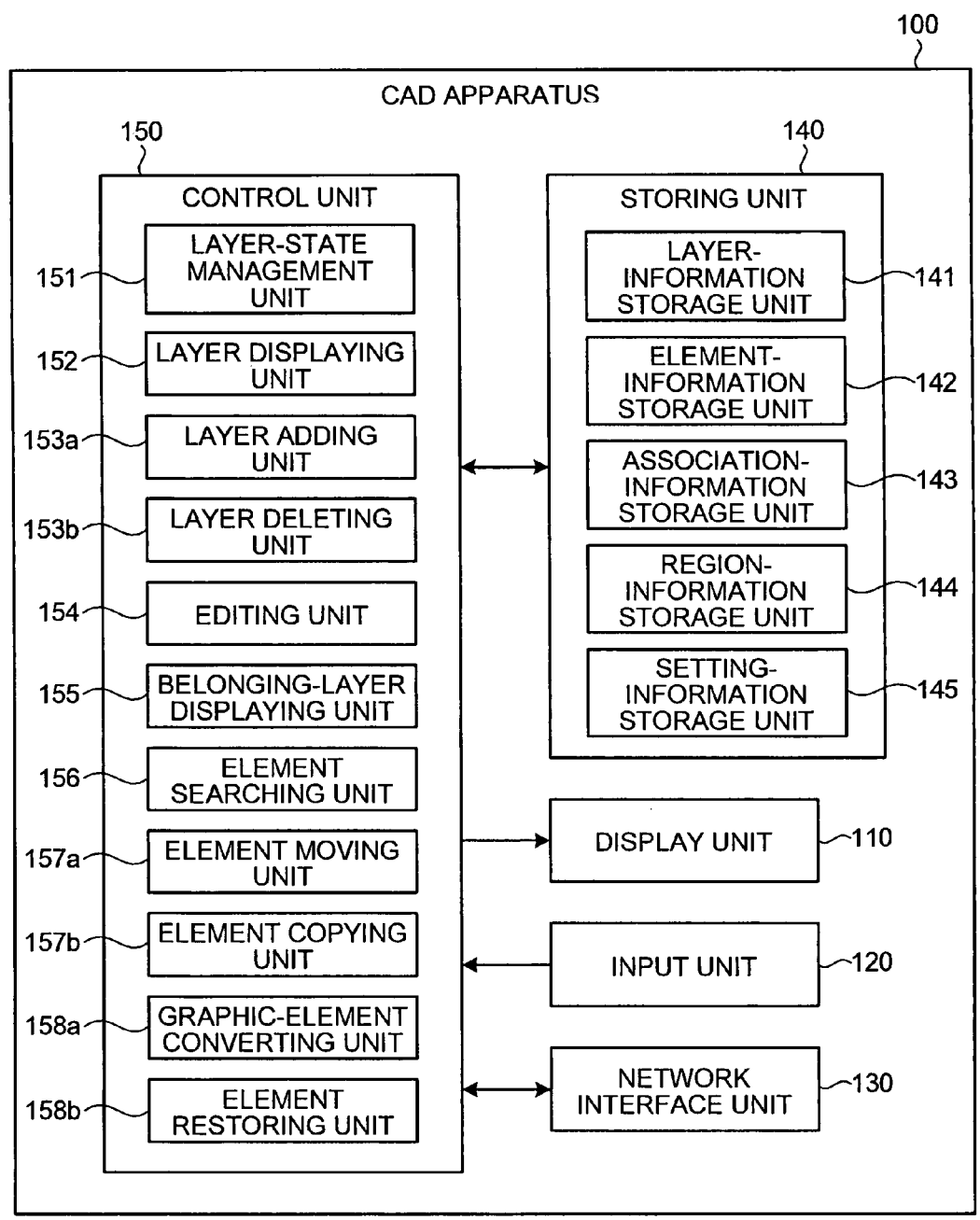
FIG. 5 is a functional block diagram of configuration of a CAD apparatus according to an embodiment.

Next, configuration of a CAD apparatus 100 according to the embodiment is explained below. FIG. 5 is a functional block diagram of configuration of the CAD apparatus 100. The CAD apparatus 100 includes a display unit 110, an input unit 120, a network interface unit 130, a storing unit 140, and a control unit 150.

The display unit 110 is a display device that displays graphic data and various screens, such as screens for performing various operations, and includes a liquid crystal display or another display device. The input unit 120 is a device for a user to input instructions, such as an instruction for displaying or editing graphic data, and includes a keyboard, a mouse, and the like. The network interface unit 130 is an interface device for exchanging information with another CAD device (not shown) or a database device (not shown) via a network (not shown).

The storing unit 140 is a storing unit that stores therein various information, and includes a layer-information storage unit 141, an element-information storage unit 142, an association-information storage unit 143, a region-information storage unit 144, and a setting-information storage unit 145.

Figure 9:
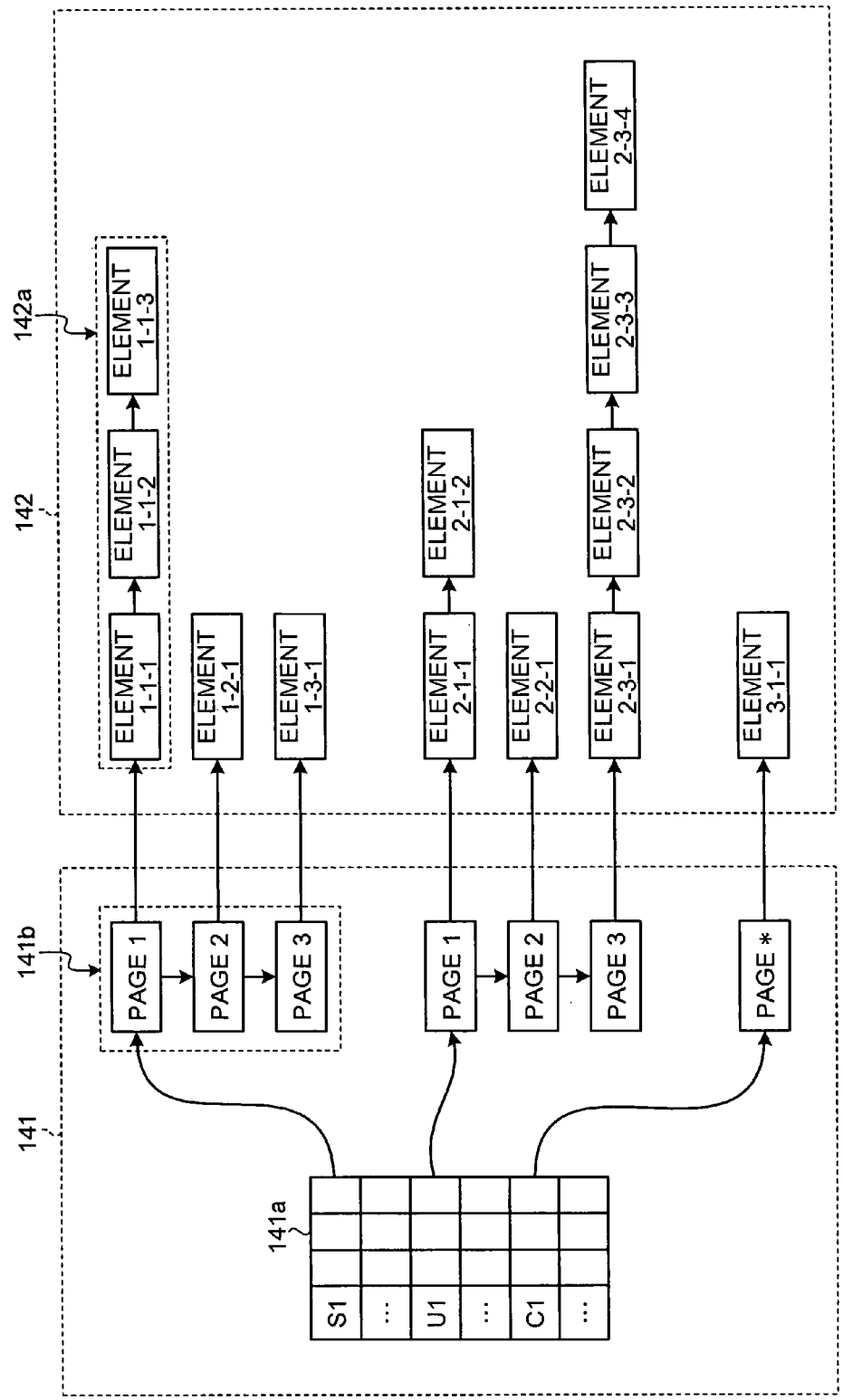
FIG. 9 is an explanatory view for explaining relation between layers and elements.

The layer-information storage unit 141 stores therein a layer management table 141a shown in FIG. 6 that manages an order of layers that form graphic data and display availability of each layer, and page lists 141b shown in FIG. 9 that manages information about pages included in each layer.

As shown in FIG. 6, the layer management table 141a includes items such as layer number, layer name, comment, effectiveness flag, display flag, and edit flag for each layer. A layer number is a unique code for identifying a layer. The layer number can be a combination of a character indicating a layer type and numeral indicating a serial order.

If a layer number begins with a character S, it means that that layer is a system layer. The system layer is a layer created by the CAD apparatus 100 with respect to each graphic data of drawing at the default. The use of a system layer is assumed in advance, and the layer name and the comment are set to respective predetermined values in accordance with the use. The layer name is a name given to a layer, and the comment is an explanatory description about information included in the layer.

If a layer number begins with a character U, it means that that layer is an individual page layer, and if a layer number begins with a character C, it means that that layer is a common layer. The individual page layer and the common layer are layers that the user can freely add or delete, and are collectively referred to as user layers. In the user layer, the user can arbitrarily set a layer name or a comment in accordance with the use of the layer.

The layer name and the comment are displayed when a user switches between display and non-display of the layer, so that even a person other than the person who has added the layer can easily understand the role of each layer.

The individual page layer and the common layer are different from each other in terms of a page management method. The graphic data includes a plurality of pages. The individual page layers can include different information with respect to each of the pages, as described as a layer having a layer number U1 shown in FIG. 7, and are to be used for general use.

By contrast, the common layer includes only information about one page, and the same information is displayed on all of the pages as described as a layer having a layer number C1 shown in FIG. 8. If the user desires to display common information common onto the all pages, the user can omit time and effort of input by using the common layer, and can avoid a mistake in editing. Such mistakes include forgetting inputting a relevant item when a new page is added.

In the layer management table 141a, individual page layers and common layers are managed in the same format, so that when display or non-display of a layer is changed, or when a layer is deleted, the CAD apparatus 100 can process the layer through a common procedure without paying attention to whether the layer subjected to the processing is an individual page layer or a common layer.

The effectiveness flag is a flag that indicates whether the layer is effective. If the value of the effectiveness flag of a layer is 1, it means that that layer is present, and if the value of the effectiveness flag of a layer is 0, it means that that layer is not present. The layer management table 141a includes a predetermined number of entries in advance, and the value of the effectiveness flag is changed in accordance with addition or deletion of a layer.

The display flag is a flag that indicates whether to display a layer corresponding to the entry. If the value of the display flag of a layer is 1, it means that that layer is to be displayed, and if the value of the display flag of a layer is 0, it means that that layer is not to be displayed.

If there is a plurality of layers with the value 1 as the display flag in the layer management table 141a, all those layers are displayed in a superposed manner, and the order to superpose the layers is determined in accordance with the order of the entries in the layer management table 141a. In other words, a layer in the lower entry in the layer management table 141a is in the lower order to be superposed.

The edit flag is a flag that indicates whether a layer corresponding to the entry is to be edited. If the value of the edit flag of a layer is 1, it means that that layer is to be edited, and if the value of the edit flag of a layer is 0, it means that that layer is not to be edited. Instead of controlling power of editing a layer by providing a corresponding flag, the power of editing can be controlled in accordance with authority level of the user or a service division or department to which the user belongs.

The layer management table 141a shown in FIG. 6 is merely an example, and it can also be configured to store therein only present entries as in a table or a list without the effectiveness flag. In addition to user layers, system layers can also provide a distinction between an individual page layer and a common layer.

Returning to FIG. 5, the element-information storage unit 142 is a storage unit that stores therein information about various elements arranged on a layer. The elements referred here represent, for example, symbols of parts arranged on the circuit diagram, wiring that connects the parts, and various character information.

Relation between layers and elements arranged on the layers is shown in FIG. 9. Specifically, the layer-information storage unit 141 stores therein page lists 141b in addition to the layer management table 141a. Each of the page lists 141b corresponds to each of the entries in the layer management table 141a, and includes a page object as a member, the page object being corresponding to each of pages in a layer corresponding to each of the entries.

In the example shown in FIG. 9, a layer having a layer number S1 includes three pages, and is connected to the page list 141b that includes three page objects, from page 1 to page 3, as members. A layer having a layer number C1, which is a common layer, includes one page, and is connected to the page list 141b that includes a single page object, page *, as a member.

Each of the members in the page lists 141b is connected to an element list 142a stored in the element-information storage unit 142. The element list 142a is present with respect to each of pages in each layer, and includes an element as a member, the element being arranged on the page corresponding to a connected page object.

In the example shown in FIG. 9, a page object page 1 corresponding to the first page of the layer having the layer number S1 is connected to the element list 142a that includes three members, an element 1-1-1 to an element 1-1-3. It means that if the first page of the layer having the layer number S1 is displayed, graphics and characters represented by the three elements are to be displayed onto the display unit 110.

Figure 10:
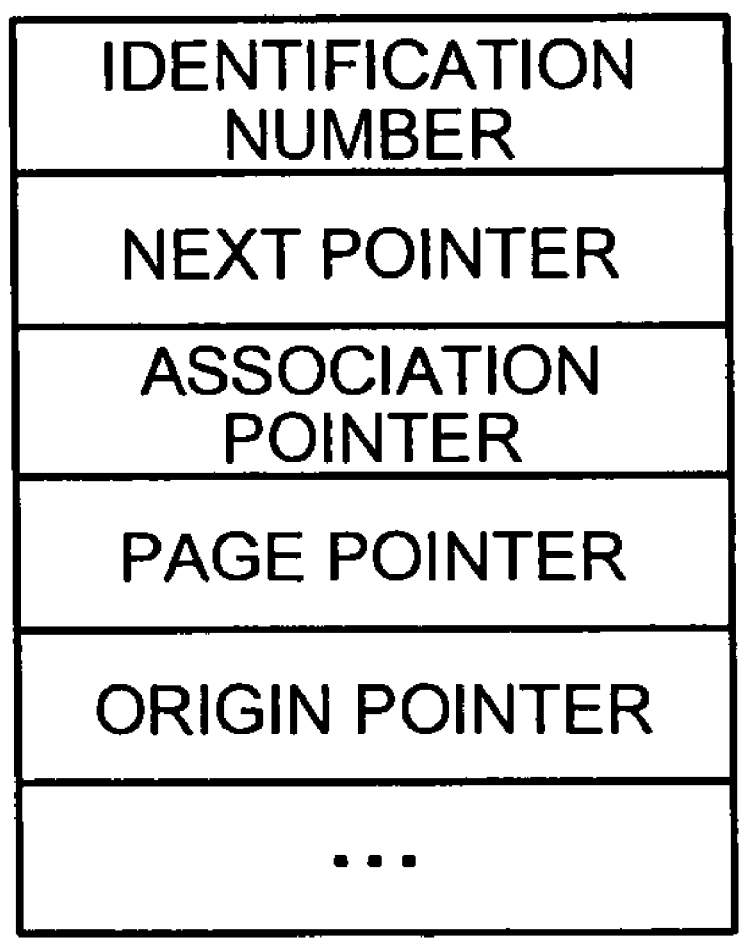
FIG. 10 is a schematic diagram of a structure of an element.

A structure of an element included in the element list 142a is shown in FIG. 10. In other words, each element includes information common to all elements such as an identification number, a next pointer, an association pointer, a page pointer, and an origin pointer, in addition to information unique to the element, such as graphic information and character information. The identification number is a unique code for identifying the element.

The next pointer is a pointer that indicates the next member in the element list 142a. The association pointer is a pointer that indicates an association list for associating elements with each other, and the page pointer is a pointer that indicates a page object connected to the element list in which the element is included. The origin pointer is a pointer that indicates an original element, if the element is an element created by graphic element conversion. Details of association between elements and details of graphic element conversion will be described later.

Returning to the explanation of FIG. 5, the association-information storage unit 143 is a storage unit that stores therein information about association between elements arranged on a layer. For example, by associating a part arranged on the circuit diagram layer with restrictions on the part arranged on the restriction layer, if the part on the circuit diagram layer is deleted, the associated restrictions on the part can be deleted in a synchronized manner, so that efficiency of editing work of graphic data can be largely improved, and mistakes in edit can be reduced.

In addition to a case when an element is deleted, the association between elements is also used for other cases, for example, when an element is moved, when an element is copied, and when another relevant element is desired to know. For example, if a part on the circuit diagram layer is moved or copied, positional relation between the part and the restrictions can be retained by moving or copying the associated restrictions in a synchronized manner. In addition, by displaying an associated element in a highlighted manner, the element associated to the part can be expressed clearly.

A mechanism of association between elements is explained below with reference to FIG. 11. If an element 1-1-2 arranged on the layer having the layer number S1 is to be associated with an element 2-1-1 arranged on a layer having a layer number S2, an empty association list 143a is created in the association-information storage unit 143 at first, and then the association list 143a is connected to the element 1-1-2. The association list 143a is a list configured to include an association object indicating an associated counterpart element as a member, and is present with respect to each element having association.

An association object named as an association 1-1-2a, is then added to the created empty association list 143a, so that the association object is connected to the element 2-1-1. Consequently, the element 1-1-2 is associated with the element 2-1-1. Likewise, the element 2-1-1 is associated with the element 1-1-2, so that reciprocal association is established.

Association between elements can be established one to many rather than one to one. If the element 1-1-2 in the example shown in FIG. 11 is required to be additionally associated with an element 3-1-1, an association object is added to the association list 143*a* connected the element 1-1-2 as shown in FIG. 12, the added association object is connected to the element 3-1-1, and reverse association is also established.

The region-information storage unit 144 is a storage unit that stores therein information about an element arranged in a region divided from a page in a predetermined way. If the user selects any one of the elements displayed on the display unit 110 by operating the input unit 120, the CAD apparatus 100 uses region information stored in the region-information storage unit 144 to specify the selected elements immediately.

The region information is explained below with reference to FIG. 13. As shown in the figure, the region information includes a region table 144*a*. The region table 144*a* includes an entry with respect to each of regions divided from a page in the predetermined way, and each of the entries is connected to a page list 144*b*. The page list 144*b* is a list that includes page objects of the all pages as members, and is present with respect to each of the entries in the region table 144*a*.

Figure 13:
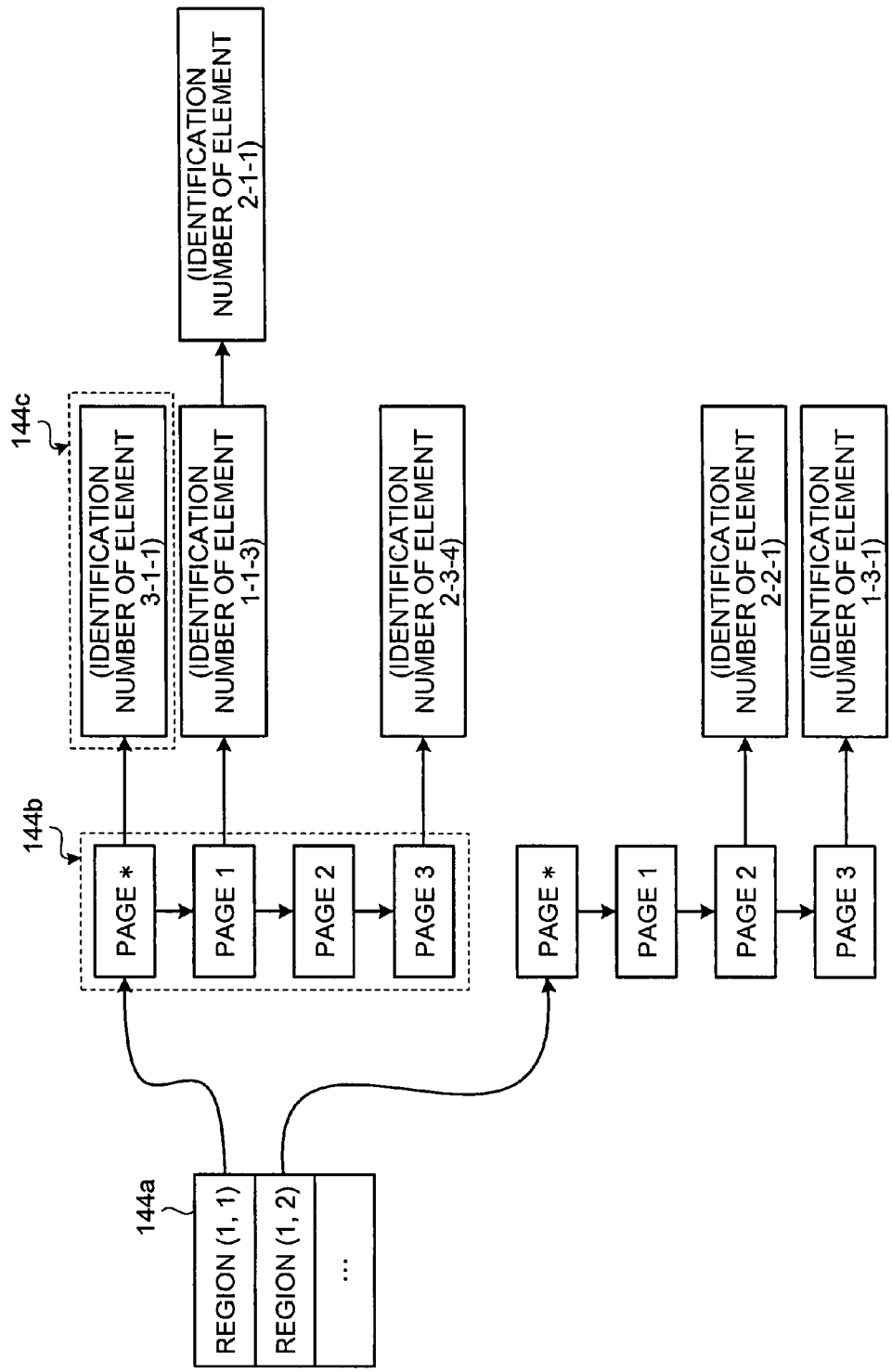
FIG. 13 is an explanatory view for explaining region information.

The page list 144*b* includes a page object corresponding to a page common to the all pages, which is to be materialized on a common layer (the page object named as "page *" in the example shown in FIG. 13).

Each of the page objects is connected to an element list 144*c* that includes the identification numbers of elements arranged in the region on the page. In the element list 144*c*, identification numbers of all elements arranged in the region on the page are included as members, regardless of which layer includes the element.

The setting-information storage unit 145 is a storage unit that stores therein various setting information for determining operations to be performed by the CAD apparatus 100. The setting information stored in the setting-information storage unit 145 includes a flag that, for example, if processing of deletion or moving is performed on an element, is to determine whether to execute the same operation onto another element associated to the element in a synchronized manner. The setting information stored in the setting-information storage unit 145 is to be renewed, for example, by an operation of the input unit 120.

In the following, the control unit 150 is explained. The control unit 150 is a control unit that controls the CAD apparatus 100 totally. The control unit 150 includes a layer-state management unit 151, a layer displaying unit 152, a layer adding unit 153*a*, a layer deleting unit 153*b*, an editing unit 154, a belonging-layer displaying unit 155, an element searching unit 156, an element moving unit 157*a*, an element copying unit 157*b*, a graphic-element converting unit 158*a*, and an element restoring unit 158*b*.

The layer-state management unit 151 is a processing unit that manages superposing orders, availability of display, and availability of edit of each of layers that form graphic data. When a certain operation is performed at the input unit 120, the layer-state management unit 151 displays a layer control screen onto the display unit 110, and renews contents of the layer management table 141*a* in accordance with an operation performed onto the screen.

FIG. 14 is a schematic diagram of a screen example of the layer control screen. As shown in the figure, on the layer control screen, information about entries having the value 1 of the effectiveness flag in the layer management table 141*a* is displayed in list. The display order of entries is the same as the order in the layer management table 141*a*, and presents an order of superposing the layers.

On the layer control screen, the values of the display flags and the edit flags are displayed as ON or OFF in check boxes. When an operation of changing ON or OFF in a check box is performed, the layer-state management unit 151 renews the value of the display flag or the edit flag corresponding to the check box.

In addition, when any one of the layers displayed in list is selected, the layer-state management unit 151 is configured to display element(s) that belongs to the selected layer from among the elements displayed on the display unit 110 in a highlighted manner, for example, by temporarily changing a color, and to notify the user the content of the layer.

In addition, if an up button or a down button is pressed in a state where one of the layers displayed in list is being selected, the layer-state management unit 151 changes the display order of the selected layer on the layer control screen, and renews the order in the layer management table 141*a*.

In addition, if a predetermined order button is pressed, the layer-state management unit 151 changes the display order of the layers on the layer control screen to the predetermined state, and renews the order in the layer management table 141*a* to the predetermined order. If the order of the layers in the layer management table 141*a* is renewed, the layer-state management unit 151 instructs the layer displaying unit 152 to re-draw the graphic data, and reflects a renewed result of the order onto the screen display.

Moreover, if a setting is determined by a user's operation such that only one layer is to be edited, the layer-state management unit 151 controls states of the check boxes such that only one layer is editable on the layer control screen.

Figure 15:
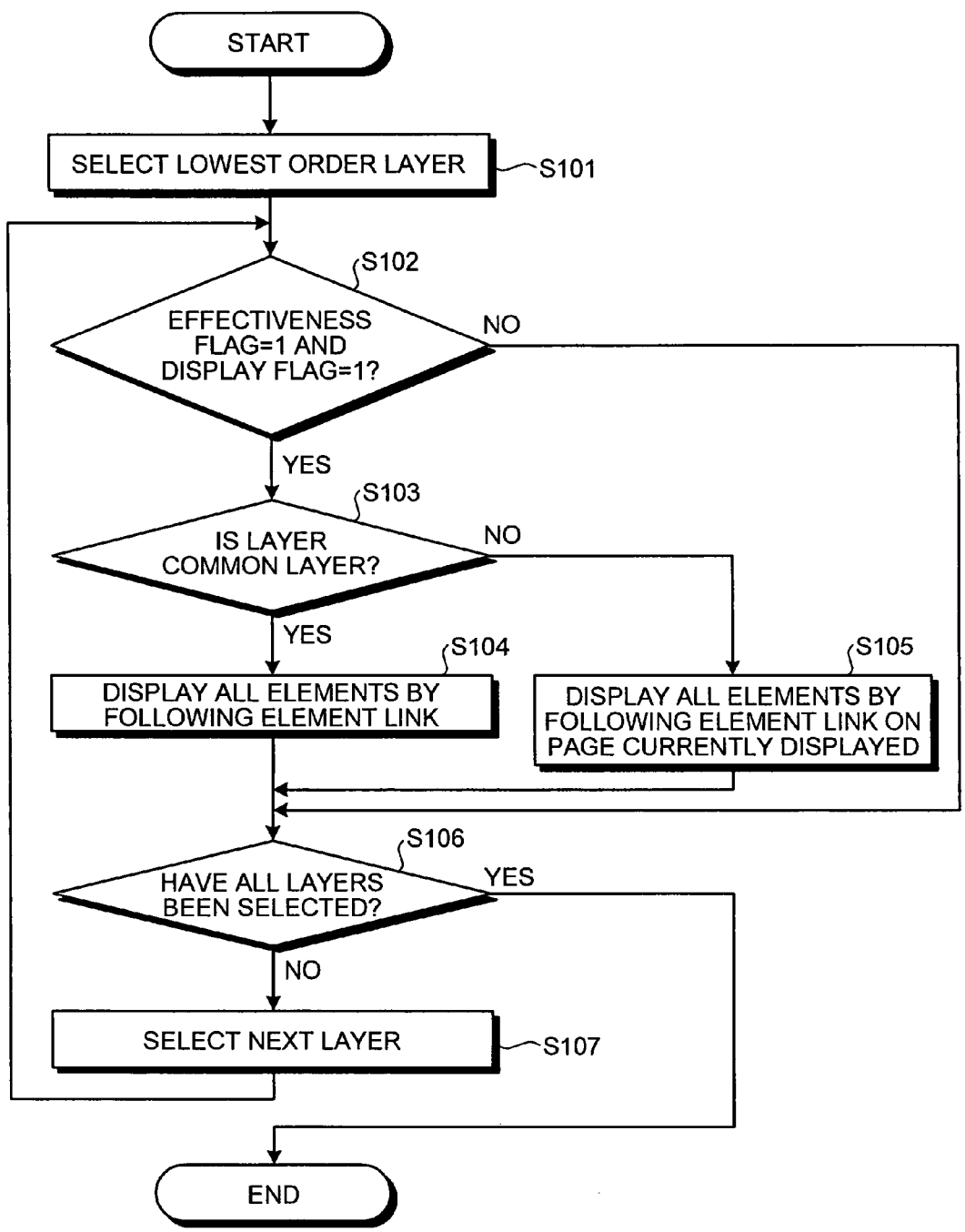
FIG. 15 is a flowchart of a process procedure of layer displaying processing.

The layer displaying unit 152 is a processing unit that displays layers included in the graphic data subjected to the processing onto the display unit 110 in a superposed manner. A process of displaying layers performed by the layer displaying unit 152 is shown in FIG. 15. As shown in the figure, the layer displaying unit 152 selects a layer in the lowest order in the layer management table 141*a* (step S101).

If the value of the effectiveness flag of the selected layer is 1, and the value of the display flag is 1 (Yes at step S102); and if the layer is a common layer (Yes at step S103); all elements are displayed on the display unit 110 by following element links (step S104). If the layer is not common layer (No at step S103), all elements are displayed on the display unit 110 by following element links on the page currently displayed (step S105).

By contrast, if the value of the effectiveness flag or the display flag of the selected layer is not 1 (No at step S102), elements included in the layer are not displayed. In this way, when all layers have been selected (Yes at step S106), the processing is terminated. If the layers have not been all selected (No at step S106), the next layer is selected from the layer management table 141*a* (step S107), and the processing is returned to step S102 and continued.

The layer displaying unit 152 also performs processing to obtain a printed matter of graphic data by creating a printing image of the graphic data subjected to the processing in a similar process procedure, and outputting the created image, for example, to a printing device connected to a network via the network interface unit 130.

The layer adding unit 153*a* is a processing unit that adds a new layer to the graphic data subjected to the processing. When a certain operation is performed at the input unit 120, the layer adding unit 153*a* displays a layer addition screen onto the display unit 110, registers input information received on the screen into an unassigned entry in the layer management table 141*a*, and adds a layer.

Figure 16:
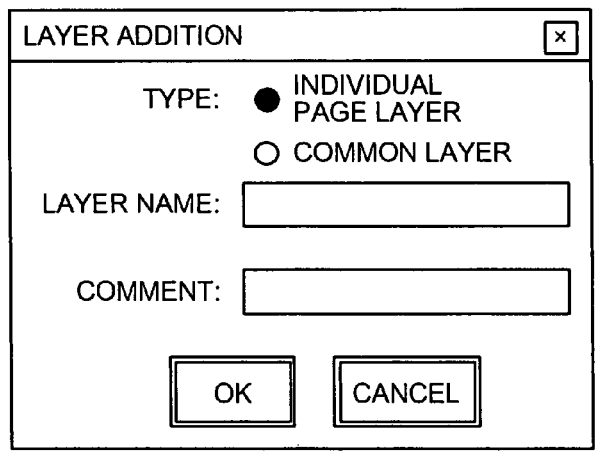
FIG. 16 is a schematic diagram of a screen example of a layer addition screen.

FIG. 16 is a schematic diagram of a screen example of the layer addition screen. As shown in the figure, radio buttons to select whether to add a layer as an individual page layer or a common layer, an input field into which a layer name is input, and an input field into which a comment is input are provided on the layer addition screen. When information is appropriately input onto the screen and an OK button is pressed, the layer adding unit 153*a* selects an unassigned entry in the layer management table 141*a*, and stores the input information into the selected entry.

Although it is assumed that the display flag and the edit flag are set to predetermined values in this case, it is also possible that the values of the display flag and the edit flag can be explicitly specified on the layer addition screen.

Figure 17:
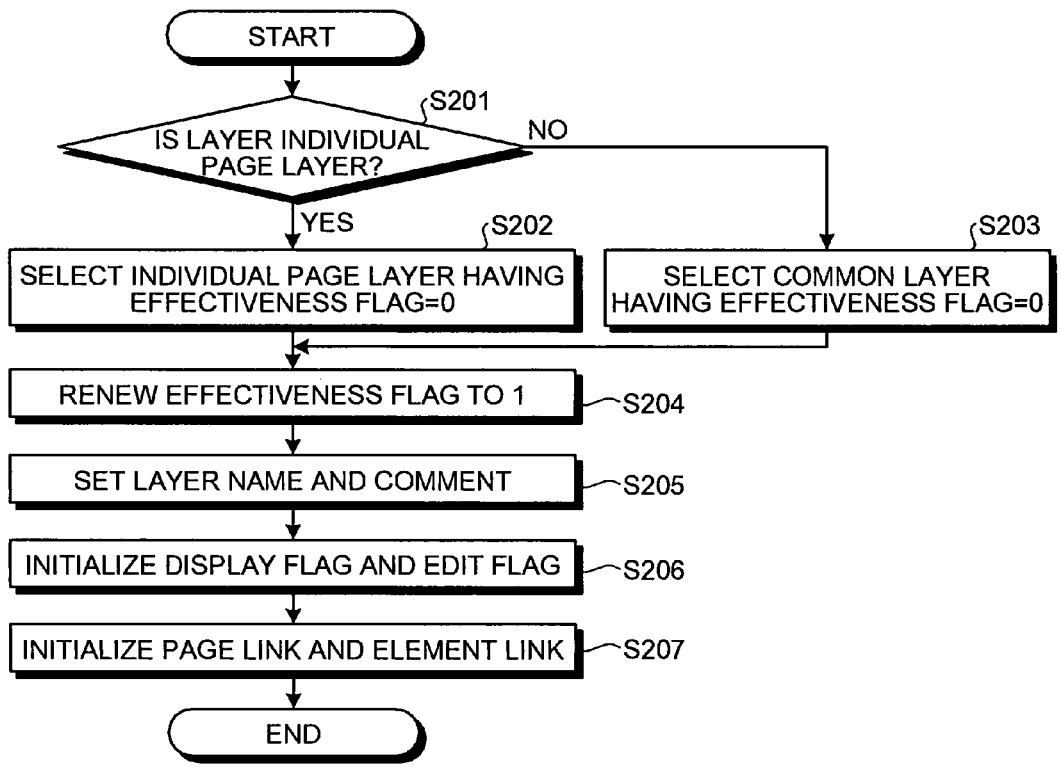
FIG. 17 is a flowchart of a process procedure of layer addition processing.

A process procedure performed by the layer adding unit 153*a* is shown in FIG. 17. As shown in the figure, if a layer to be added is an individual page layer (Yes at step S201), the layer adding unit 153*a* selects an entry of an individual page layer having the value 0 of the effectiveness flag (step S202); and if a layer to be added is a common layer (No at step S201), the layer adding unit 153*a* selects an entry of a common layer having the value 0 of the effectiveness flag (step S203).

The effectiveness flag of the selected entry is then renewed to 1 (step S204), and an input layer name and an input comment received on the layer addition screen are set into the entry (step S205). The display flag and the edit flag of the entry are set to predetermined values and initialized (step S206), and the page link and the element link(s) connected to the entry are also initialized (step S207).

Although the superposing order of the layers are not touched in the above process procedure, the newly added layer can be moved to the highest order or the lowest order in the layer management table 141*a*.

The layer deleting unit 153*b* is a processing unit that deletes a specified layer from among the layers that form the graphic data subjected to the processing. When a certain operation is performed at the input unit 120, the layer deleting unit 153*b* deletes a layer selected by the operation by changing to 0 the value of the effectiveness flag of an entry in the layer management table 141*a* corresponding to the selected layer.

When deleting the layer, the layer deleting unit 153*b* deletes elements arranged on the layer not to create inconsistency by considering associations with other elements and graphic element conversion.

Figure 18:
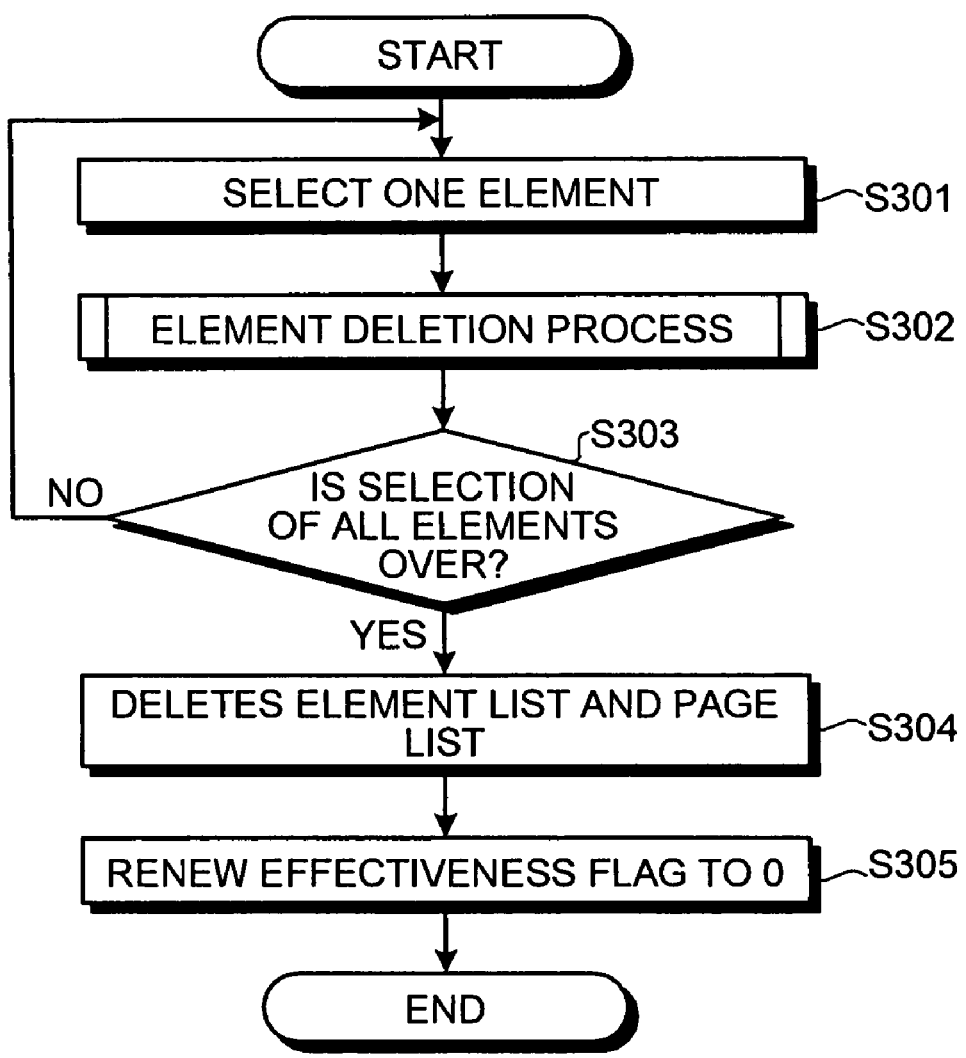
FIG. 18 is a flowchart of a process procedure of layer deletion processing.

A process procedure of layer deletion processing performed by the layer deleting unit 153*b* is shown in FIG. 18. As shown in the figure, when deletion of a layer is instructed, the layer deleting unit 153*b* selects an element from an element list connected to the deletion target layer (step S301). The selected element is deleted by executing element deletion processing (step S302), which will be described later. Subsequently, the layer deleting unit 153*b* repeats steps S301 and S302 until there is no element left for selection (step S303).

When there is no element left for selection (Yes at step S303), the layer deleting unit 153*b* deletes the page list and the element list connected to the deletion target layer (step S304), renews to 0 the value of the effectiveness flag of the deletion target layer (step S305), and terminates the processing.

The above process procedure is a process procedure in a case when deletion of one layer is instructed. If deletion of a plurality of layers is instructed, the process procedure is executed on each of the deletion target layers.

Figure 19:
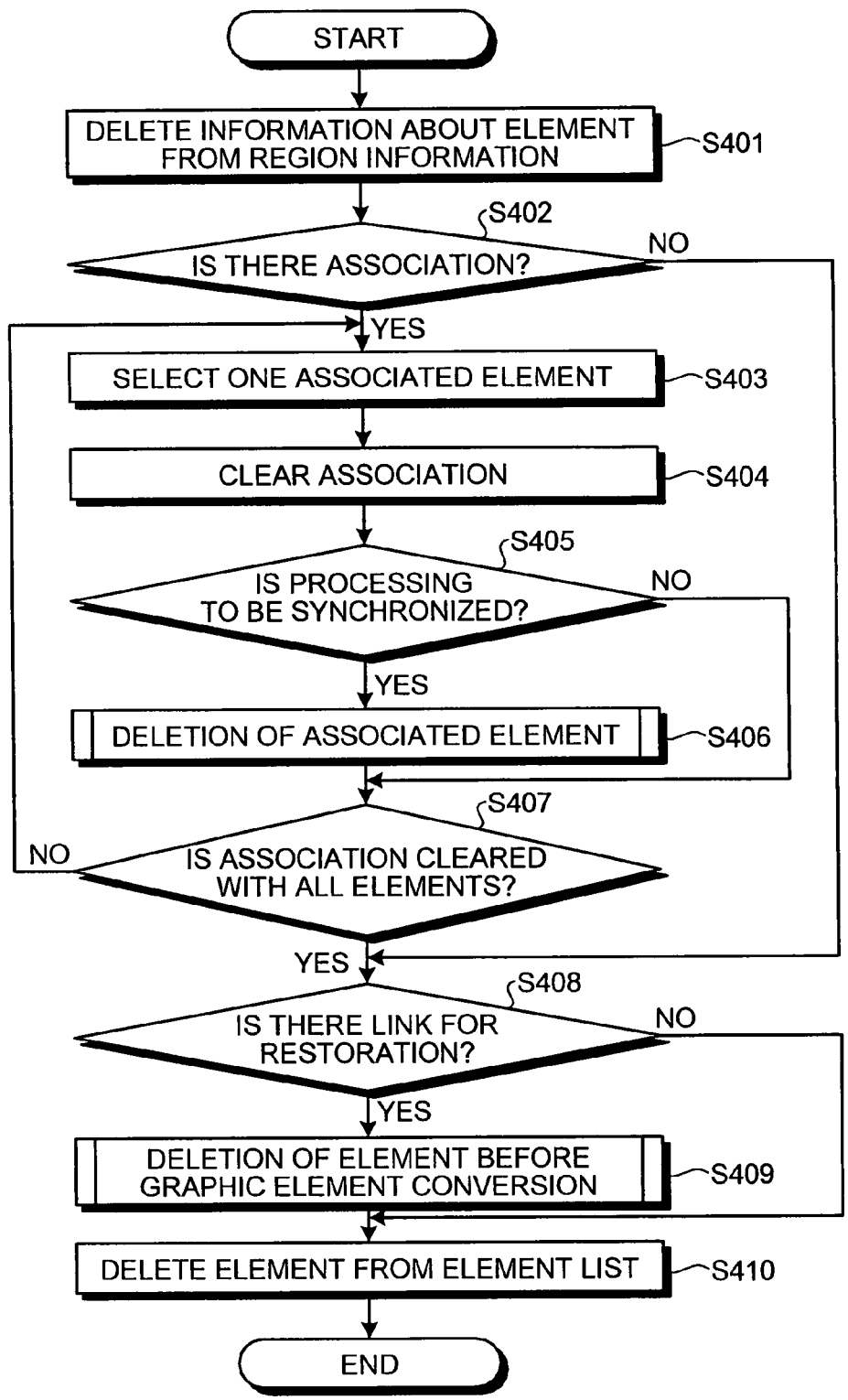
FIG. 19 is a flowchart of a process procedure of element deletion processing.

FIG. 19 is a flowchart of a process procedure of the element deletion processing. As shown in the figure, when deletion of an element is required, the layer deleting unit 153*b* deletes at first information about the element from the region information stored in the region-information storage unit 144 (step S401).

If the element is associated with another element (Yes at step S402), an associated element is selected (step S403), and association with the selected element is cleared (step S404). If the setting is determined to perform the same processing on the associated element in a synchronized manner (Yes at step s405), the element deletion processing is recursively executed, and the associated element is deleted (step S406).

In this way, after the association with the selected element is cleared, if the deletion target element is also associated with another element (No at step S407), the layer deleting unit 153*b* returns to step S403, and clears association with the next element.

By contrast, if associations with all elements have been cleared (Yes at step S407), or the deletion target element is not associated with any elements (No at step S402), and if an element before graphic element conversion is connected via the origin pointer of the deletion target element (Yes at step S408), the element deletion processing is recursively executed, and the element connected via the origin pointer is deleted (step S409).

In this way, after all information related to the deletion target element is deleted, the layer deleting unit 153*b* deletes the deletion target element from the element list, and terminates the element deletion processing (step S410). In addition to the case when a layer is deleted, if an element included in a layer is required to be deleted, the above element deletion processing is performed, for example, by the editing unit 154.

In the above processing, when an element is deleted, there is a possibility that a relevant element, such as parts arranged on the circuit diagram layer, could be deleted unintentionally. Therefore, when an associated element is to be deleted, it can be configured to display such deletion in advance, and to confirm acceptability of the deletion to the user. In addition, because it is conceivable that a relevant element is often arranged on system layers, it can be configured to perform the above confirmation only if the associated elements include an element arranged on a system layer.

The editing unit 154 is a processing unit that executes edit processing, for example, adding an element into a layer included in graphic data subjected to the processing, revising a content of an element, and deleting an element, in accordance with an operation performed at the input unit 120. When an operation of adding a new element is performed, the editing unit 154 determines a layer to be added with the new element based on the setting information stored in the setting-information storage unit 145.

Figure 20:
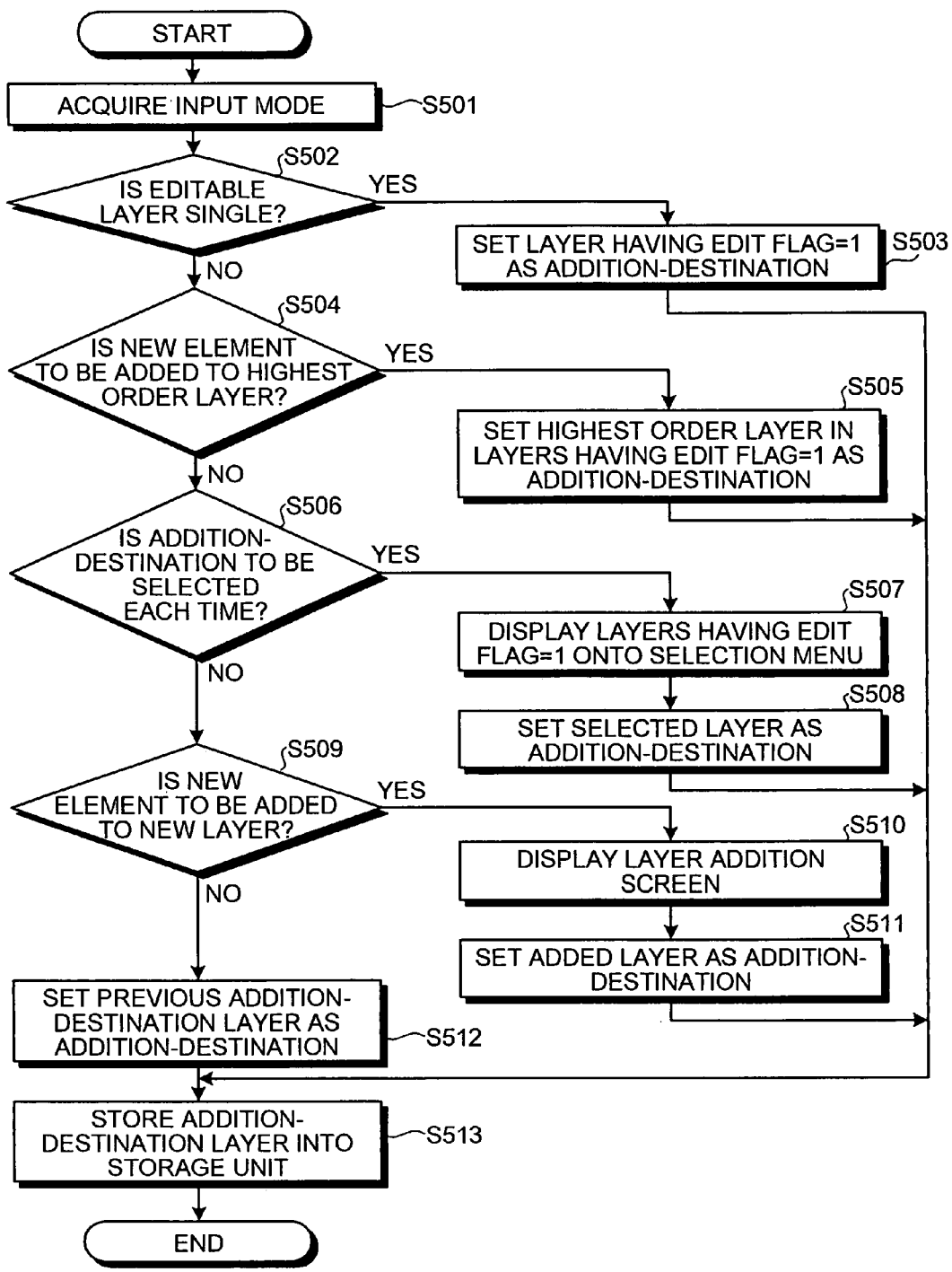
FIG. 20 is a flowchart of a process procedure of determination-processing for an addition-destination layer.

A process procedure of processing in which the editing unit 154 determines a layer to be added with a new element is shown in FIG. 20. As shown in the figure, the editing unit 154 acquires the setting information about an input mode from the setting-information storage unit 145 (step S501). If the input mode is set such that only one layer is to be edited (Yes at step S502), a layer having the value 1 of the edit flag in the layer management table 141*a* is set as the layer to be added with a new element (step S503).

In contrast, if the input mode is set such that a new element is to be added into a layer in the highest order (Yes at step S504), a layer in the highest order from among layers having the value 1 of the edit flag in the layer management table 141*a* is set as the layer to be added with a new element (step S505).

In addition, if the input mode is set such that a layer of the destination of addition is to be selected each time (Yes at step S506), a list of layers having the value 1 of the edit flag in the layer management table 141a is displayed on a selection menu (step S507), and then a selected layer is set as the layer to be added with a new element (step S508).

In addition, if the input mode is set such that a new element is to be added to a new layer (Yes at step S509), the layer adding unit 153a is caused to execute display of the layer addition screen and addition processing of a layer (step S510), and then an added layer is set as the layer to be added with a new element (step S511).

Otherwise, if the acquired setting information is not applicable to any of the above cases, information about a layer of the destination of the previous addition is acquired from the setting-information storage unit 145, and then the obtained layer is set as the layer to be added with a new element (step S512).

In this way, after the layer to be added with a new element is determined, the editing unit 154 stores the layer determined this time into the setting-information storage unit 145 for the next time to determine a layer to be added with a new element (step S513).

Thus, the editing unit 154 includes a plurality of methods of determining the layer to be added with a new additional element, and is configured to switch which method to be used in accordance with the setting. Consequently, the user can select a method most appropriate to the situation, thereby improving efficiency of the editing work.

Figure 11:
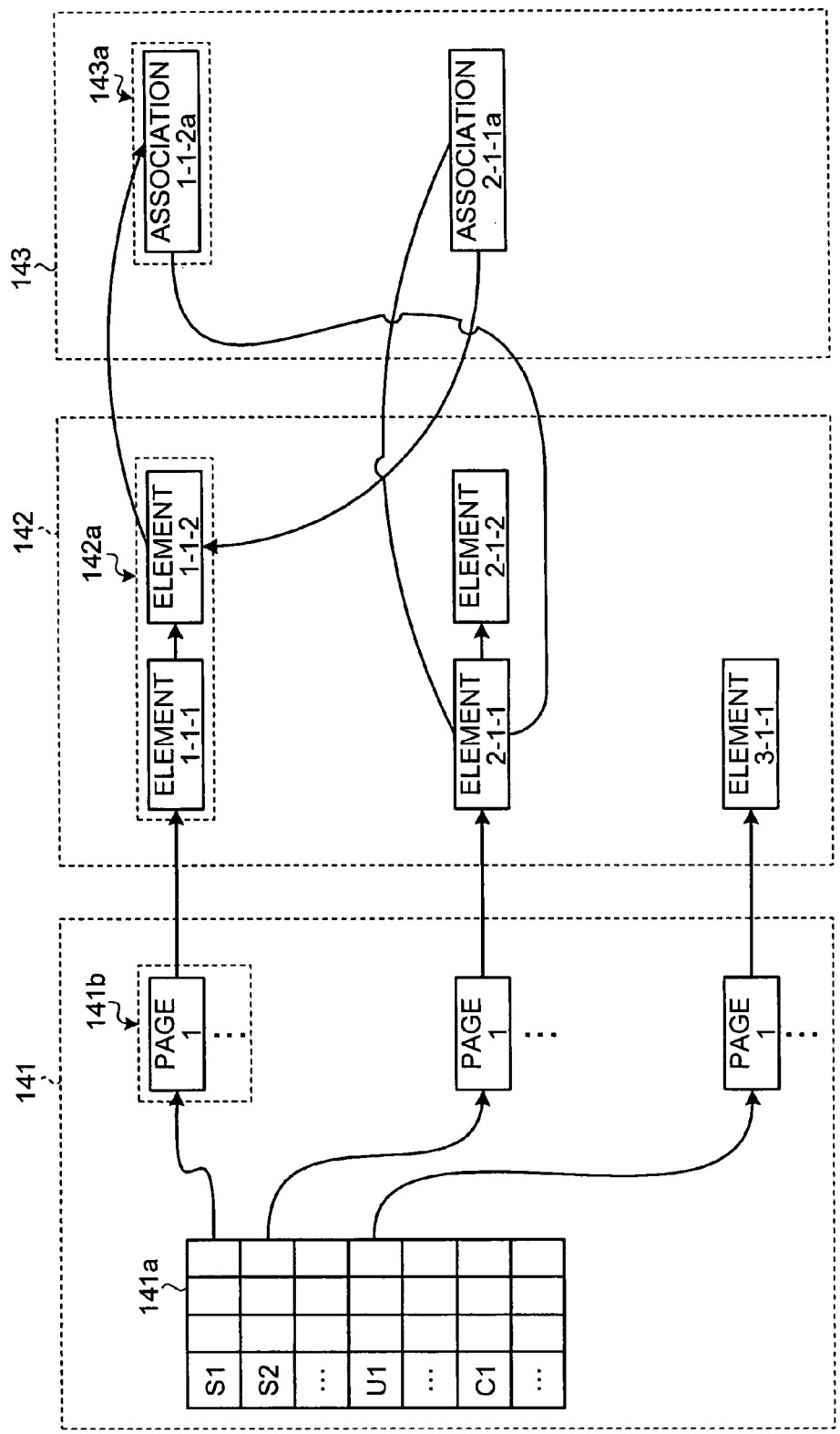
FIG. 11 is an explanatory view for explaining association of elements.
Figure 12:
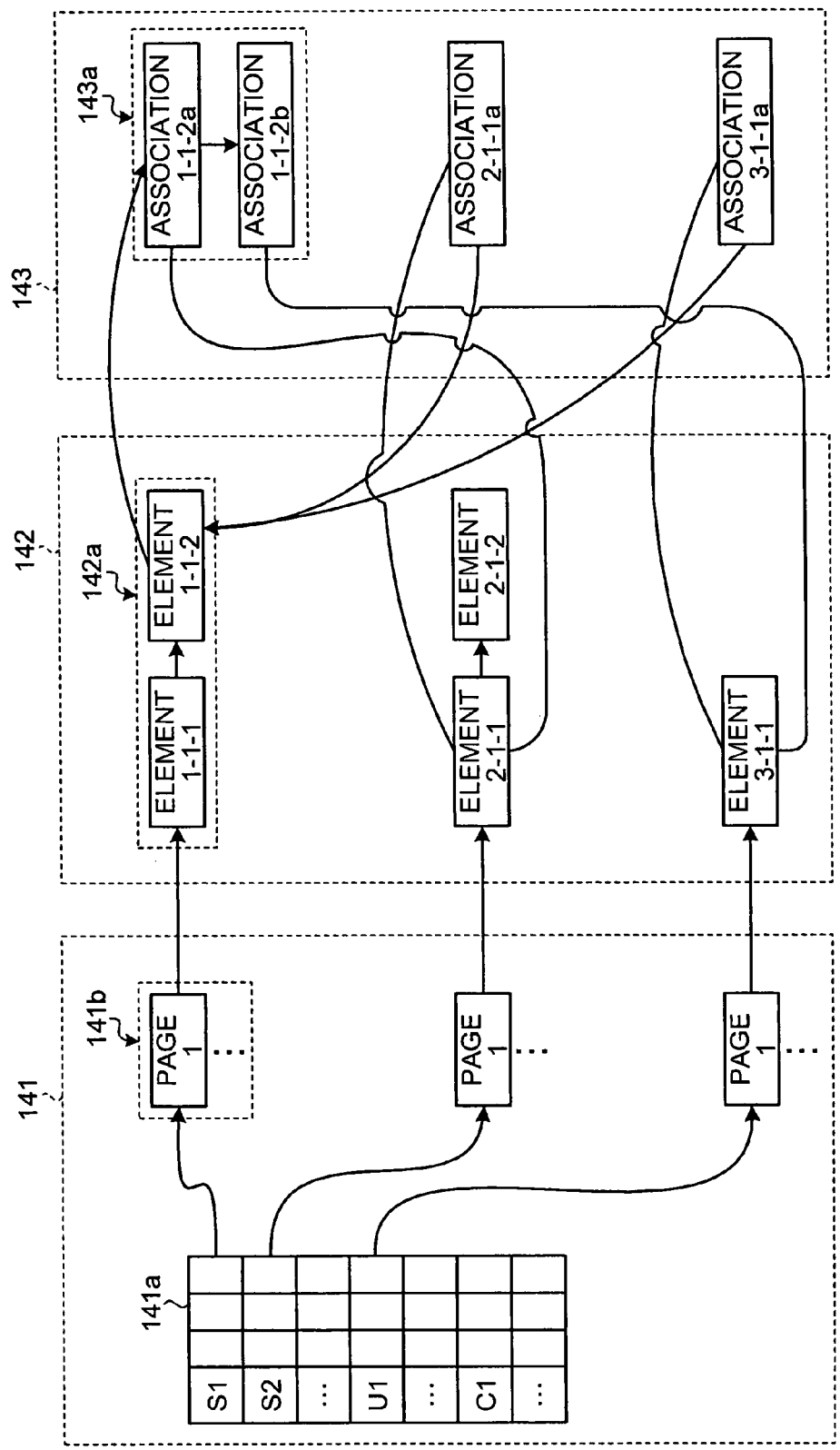
FIG. 12 is an explanatory view for explaining association of elements.

Furthermore, the editing unit 154 performs processing of associating specified elements with each other in accordance with an operation performed at the input unit 120, as shown in FIGS. 11 and 12.

Figure 21:
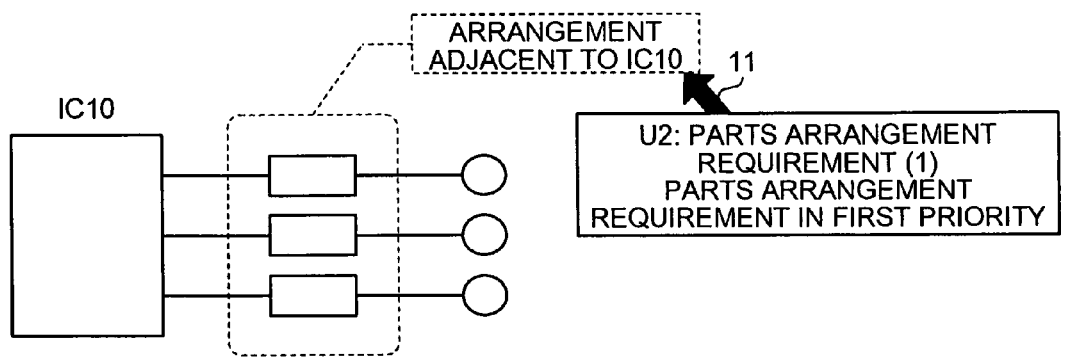
FIG. 21 is an explanatory view for explaining belonging-layer display.

The belonging-layer displaying unit 155 is a processing unit that displays which layer an element displayed on the display unit 110 belongs to. FIG. 21 is an explanatory view for explaining display of belonging-layer. As shown in the figure, if a pointer 11 (also called as a cursor) that is displayed on the display unit 110 to specify a target to be operated by the input unit 120 stays on an element for a predetermined time, the belonging-layer displaying unit 155 causes the display unit 110 to display information about a layer to which the element positioned under the pointer 11 belongs.

In an example shown in FIG. 21, a layer number U2, a layer name "parts arrangement requirement (1)", and a comment "parts arrangement requirement in first priority" are displayed as information about a layer to which an element positioned under the pointer 11 belongs. In this way, by displaying the information about the layer to which the element belongs, the user of the CAD apparatus 100 can see which layer the element belongs to, and moreover, can precisely find out meaning of the element based on the name and the comment given to the layer.

Figure 22:
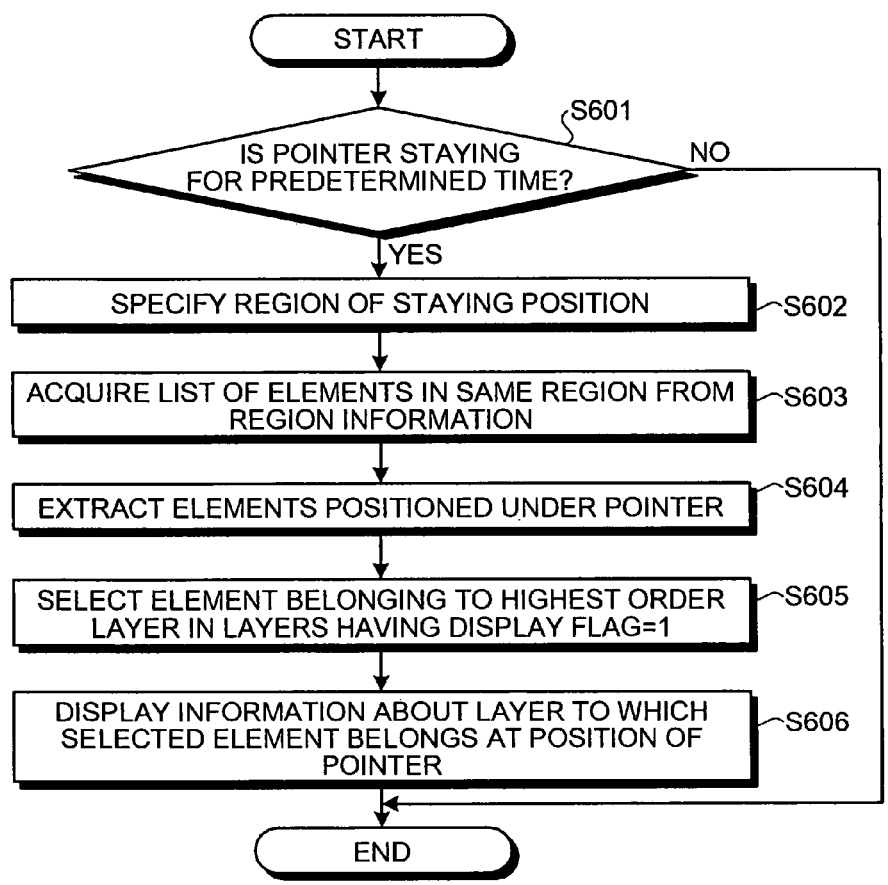
FIG. 22 is a flowchart of a process procedure of belonging-layer displaying processing.

A process procedure of processing in which the belonging-layer displaying unit 155 displays information about a layer to which an element belongs is shown in FIG. 22. As shown in the figure, the belonging-layer displaying unit 155 monitors movement of the pointer 11, and if the pointer is staying for a predetermined time (Yes at step S601), the belonging-layer displaying unit 155 specifies a region of the staying position (step S602), and acquires the element list 144c connected to the region by referring to the region information stored in the region-information storage unit 144 (step S603).

Elements positioned under the pointer 11 are then extracted from the elements indicated with the members in the acquired element list 144c (step S604). An element belonging to the layer in the highest order in layers having the value 1 of the display flag in the layer management table 141a is selected (step S605). Information such as the layer name of a layer to which the selected element belongs is displayed at the position of the pointer 11 (step S606).

In the above process procedure, the region information is referred to immediately specify the elements positioned under the pointer 11. However, the elements positioned under the pointer 11 can be specified without referring to the information. In addition, although in the above process procedure, the information about the layer is displayed using a state as a trigger that the pointer 11 stays for a predetermined time, it can also be configured to display the information about the layer to which an element being selected belongs, if display of the information about the layer is explicitly instructed by an operation of selecting on a menu.

The element searching unit 156 is a processing unit that searches for an element that satisfies a certain condition from among elements included in the graphic data subjected to the processing. When a certain operation is performed at the input unit 120, the element searching unit 156 displays an element search screen onto the display unit 110, searches for an element based on an input search condition received on the screen, and displays an element satisfying the search condition in a highlighted manner by changing a color of the element or flashing the element.

Figure 23:
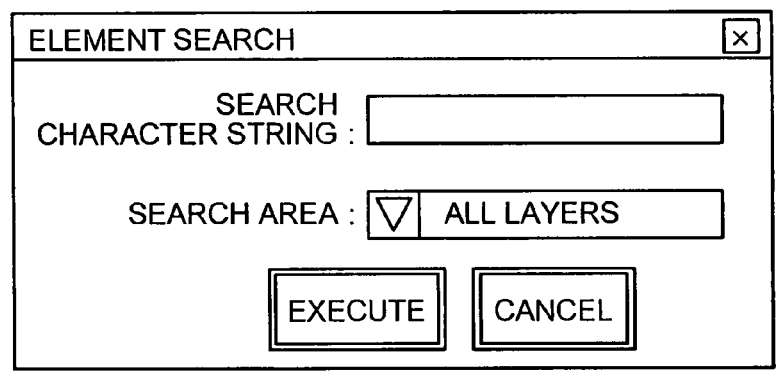
FIG. 23 is a schematic diagram of a screen example of an element search screen.

FIG. 23 is a schematic diagram of a screen example of the element search screen. As shown in the figure, an input field into which a search character string is input, and a menu for selecting a layer to be searched are provided on the element search screen. The menu for selecting a layer to be searched is set such that all layers are to be searched in a predetermined state, however, the menu can be set such that only specific layer(s) is to be searched.

When a search condition is received on the screen, and an execute button is pressed, the element searching unit 156 searches for an element that includes the specified search character string from the layer(s) specified as search area(s), and displays the searched element in a highlighted manner. Because layers to be searched can be specified, the user of the CAD apparatus 100 can appropriately narrow down search areas by explicitly specifying a layer that includes information about the restrictions or a layer that includes information about parts information.

The element moving unit 157a is a processing unit that moves an element arranged on a layer. Moving of an element can be performed within the same layer, and also between different layers. Moreover, moving of an element can be performed by selecting only one element, or selecting a plurality of elements, or selecting a layer and subjecting all elements arranged on the layer to the moving. When moving an element, the element moving unit 157a simultaneously moves another element associated to the moving target element, as required.

Figure 24:
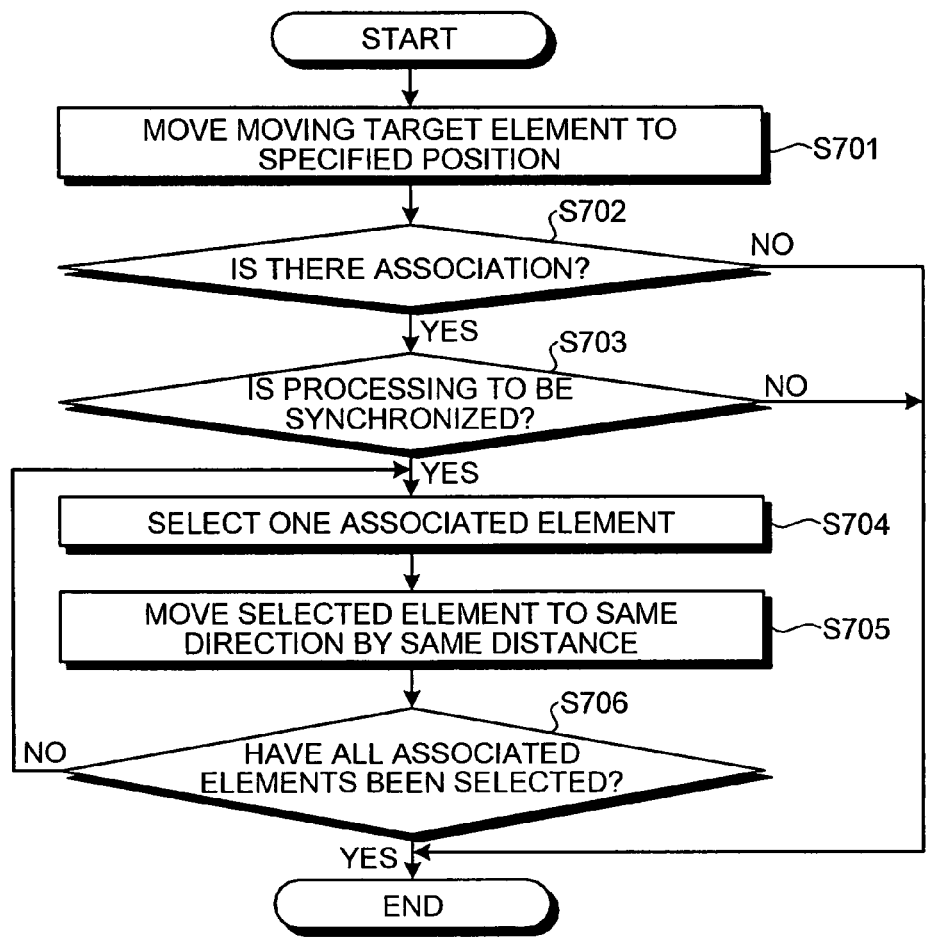
FIG. 24 is a flowchart of a process procedure for moving elements within a same layer.

FIG. 24 is a flowchart of a process procedure of moving elements within the same layer. As shown in the figure, the element moving unit 157a moves a moving target element to a specified position (step S701). If the moving target element is not associated with any other element (No at step S702), or if the setting is not determined such that the same processing is to be performed on an associated element in a synchronized manner (No at step S703), the processing is terminated.

By contrast, if the moving target element is associated with another element (Yes at step S702), and the setting is determined such that the same processing is to be performed on the associated element in a synchronized manner (Yes at step S703), an associated element is selected (step S704), and the selected element is moved to the same direction by the same distance as the moving target element (step S705). If there is any other associated element (No at step S706), the element moving unit 157a returns to step S704 and moves the element, otherwise if all associated elements have been selected (Yes at step S706), the processing is terminated.

The above process procedure is a process procedure in a case of moving one element. If moving of a plurality of elements is instructed, the process procedure is executed on each of the moving target elements.

Figure 25:
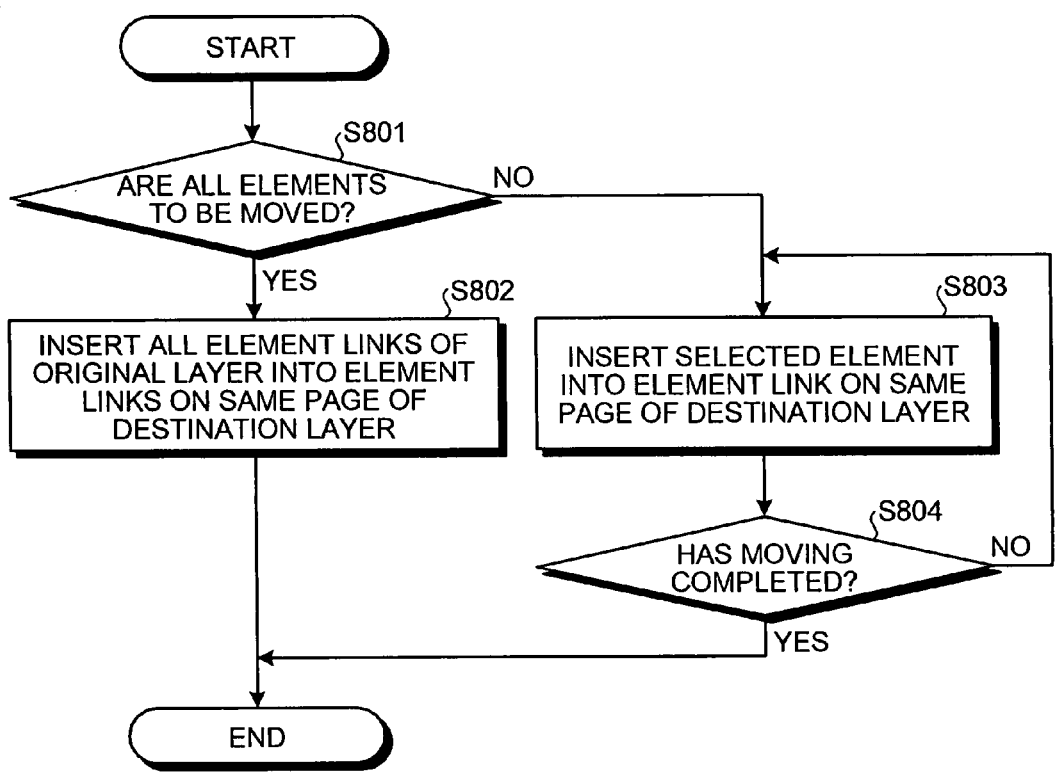
FIG. 25 is a flowchart of a process procedure for moving elements between different layers.

FIG. 25 is a flowchart of a process procedure of moving elements between different layers. As shown in the figure, an instruction is made to move all elements arranged on a layer to another layer (Yes at step S801), the element moving unit 157a inserts all element links connected to an original layer into element links on the same page of a destination layer entirely (step S802).

By contrast, if an instruction is made to move a part of elements arranged on a layer to another layer (No at step S801), one of the instructed elements is inserted into an element link on the same page of a destination layer (step S803). When all of the specified elements have been moved (Yes at step S804), the processing is terminated, otherwise (No at step S804) the element moving unit 157a returns to step S803, and moves the next element.

The element copying unit 157b is a processing unit that copies an element arranged on a layer. Copy of an element can be performed within the same layer, and also between different layers. Moreover, copy of an element can be performed by selecting only one element, or selecting a plurality of elements, or selecting a layer and subjecting all elements arranged on the layer to the copy. When copying an element, the element copying unit 157b simultaneously copies another element associated to the copy target element, as required.

A process procedure performed by the element copying unit 157b is similar to the process procedure performed by the element moving unit 157a except leaving the copy target element in the present state, therefore detailed explanation is omitted.

The graphic-element converting unit 158a is a processing unit that converts an element included in graphic data subjected to edit into a graphic element. Graphic element conversion is processing of converting an element included in graphic data into a format in which the appearance of the element remains unchanged while the element is to be ignored in downstream processes, such as designing support work and manufacturing, and embedding the converted element into the graphic data. Typically, when a design is revised, the graphic element conversion is used to keep an element before being revised in the graphic data as a revision history.

Figure 26:
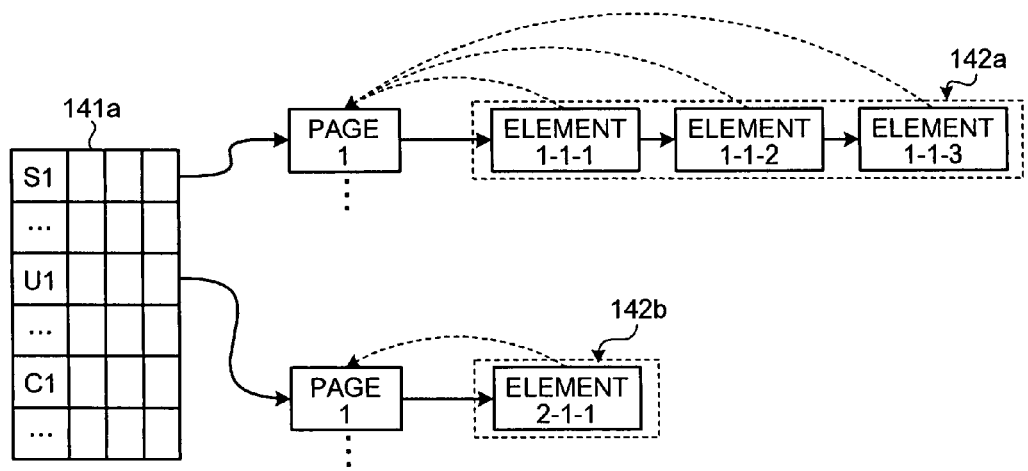
FIG. 26 is a schematic diagram of a data structure before converting an element to a graphic element.

An outline of the graphic element conversion is explained below with reference to the drawings. FIG. 26 is a schematic diagram of a data structure before converting an element to a graphic element. In an example shown in the figure, a page object of the first page of the entry having the layer number S1 in the layer management table 141a is connected to the element list 142a that includes the three elements from the element 1-1-1 to the element 1-1-3 as members.

Each of the three elements included in the element list 142a is connected to the next member with the next pointer, and connected to the page object corresponding to the first page of the entry having the layer number S1 with the page pointer.

Moreover, a page object of the first page of the entry having the layer number U1 is connected to an element list 142b that includes the element 2-1-1 as a member. The element included in the element list 142b is connected to the page object corresponding to the first page of the entry having the layer number U1 with the page pointer.

Figure 27:
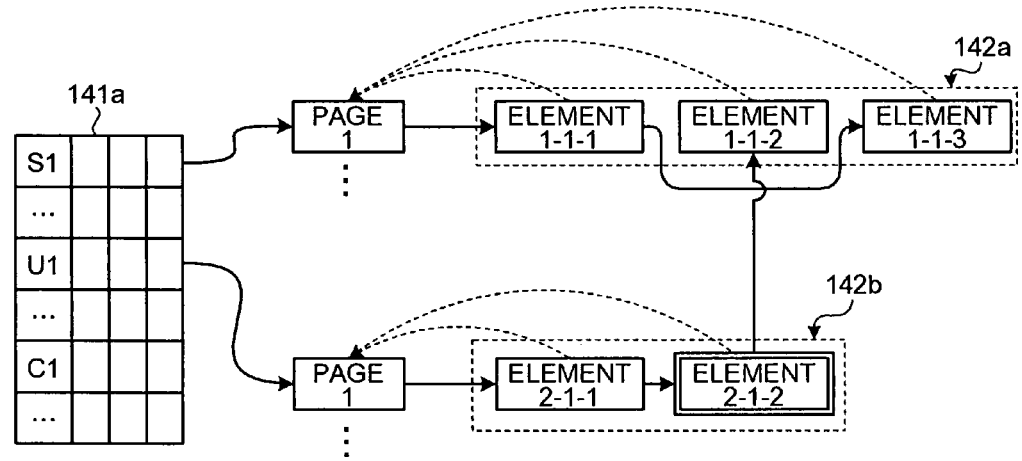
FIG. 27 is a schematic diagram of a data structure after converting an element to a graphic element.

If the element 1-1-2 included in the element list 142a is to be converted into a graphic element and to be kept in the layer having the layer number U1, as shown in FIG. 27, the element 1-1-2 is converted into an aggregation of a simple line drawing and characters, and added to the element list 142b as an element 2-1-2. Consequently, if the layer having the layer number U1 is subjected to display, an element having the same appearance as the element 1-1-2 before conversion is to be displayed.

Moreover, in the example shown in FIG. 27, although the element 1-1-2 is separated from the element list 142a, the element 1-1-2 remains still connected to the page object corresponding to the first page of the entry having the layer number S1. Furthermore, the converted element 2-1-2 is connected to the element 1-1-2 before conversion with the origin pointer.

Consequently, the element 1-1-2 that is the element before the graphic element conversion remains being kept in the layer having the layer number S1 in an invisible sate. If a certain operation is performed on the element 2-1-2 that is available to be displayed, it is capable to acquire the element before the graphic element conversion by following the origin pointer, and to restore a state before the graphic element conversion.

In the example shown in FIG. 27, when converting the element 1-1-2 into the graphic element, the element 1-1-2 is removed from the element list 142a, and made to be included in the layer in an invisible state. However, when converting the element 1-1-2 into the graphic element, the element 1-1-2 can be kept in the element list 142a, and made to be included in the layer in a state available to be displayed.

Figure 28:
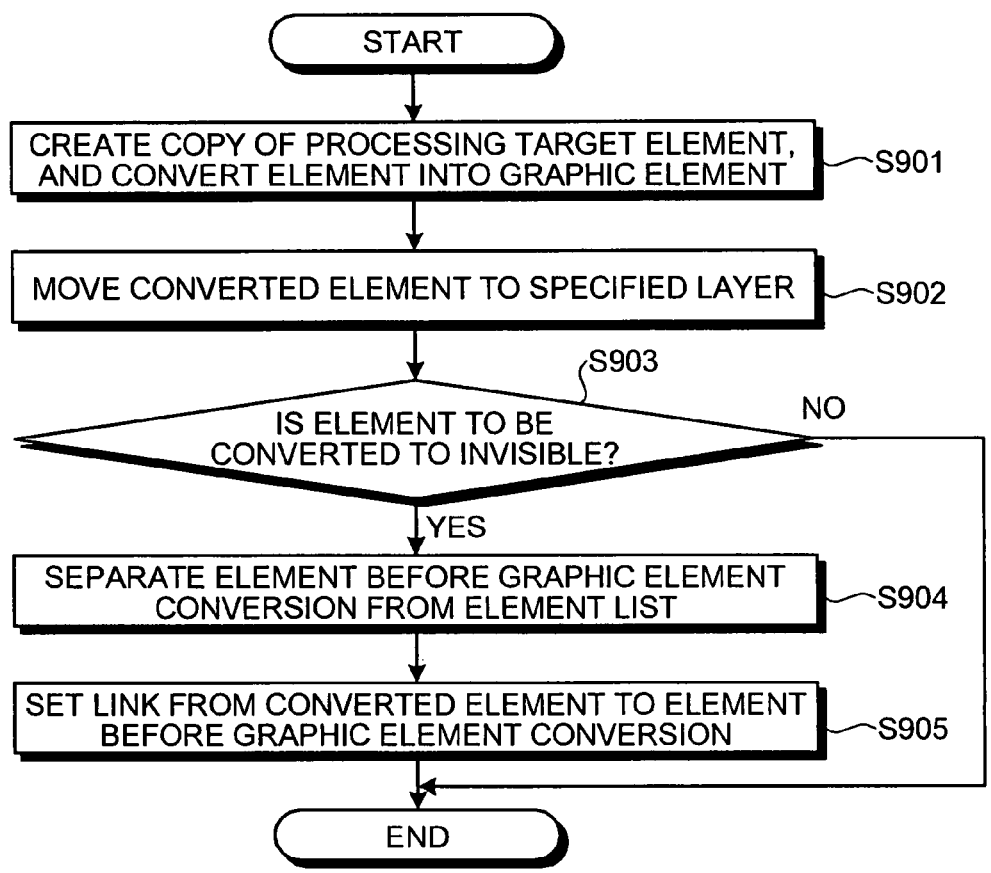
FIG. 28 is a flowchart of a process procedure for converting an element to a graphic element.

FIG. 28 is a flowchart of a process procedure for converting an element to a graphic element. As shown in the figure, when graphic element conversion of an element is instructed, the graphic-element converting unit 158a creates a copy of the element, and converts the element into a simple graphic element (step S901). The converted element is then moved to a specified layer (step S902).

If it is instructed such that the element before the graphic element conversion is to be converted to invisible (Yes at step S903), the element before the graphic element conversion is then separated from the element list (step S904), and a link is set from the origin pointer of the converted element to the element before the graphic element conversion (step S905).

Figure 29:
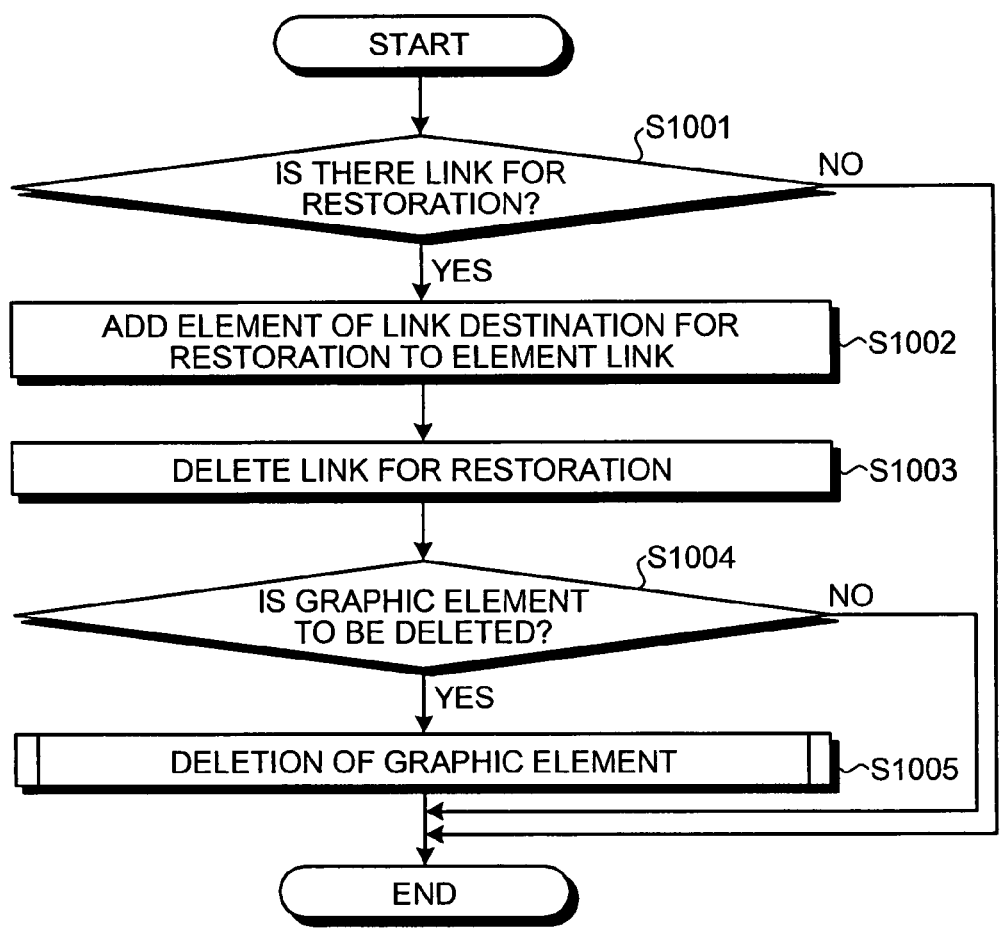
FIG. 29 is a flowchart of a process procedure of restoration processing of a converted graphic element.

The element restoring unit 158b is a processing unit that restores into an original state an element that is converted into an invisible state at graphic element conversion. A process procedure of processing of restoring an invisible element that is converted when converting the element into a graphic element is shown in FIG. 29.

As shown in the figure, if the origin pointer of a specified element has an effective link set to indicate an element before graphic element conversion (Yes at step S1001), the element restoring unit 158b adds an element of the link destination to an element link to which the specified element belongs before the graphic element conversion (step S1002), and deletes the link, which is no longer used (step S1003).

If it is instructed such that the converted graphic element is to be deleted (Yes at step S1004), the element deletion processing is executed, and the converted graphic element is deleted (step S1005).

Thus, because a mechanism is provided such that designing information before a design revision is kept in graphic data in a format uninfluential to a manufacturing process, and can be restored as required, a specific history of the design revision can be managed collectively with the design information, and the designer him/herself or a third person can easily confirm a content of the design revision. Moreover, when the design revision is required to be canceled, the design can be easily restored to the state before the design revision.

Instead of making restoration available by keeping the element before the graphic element conversion in an invisible state in the layer and providing a link from the converted graphic element, the converted graphic element can be restored to the element before the graphic element conversion by adding restoration information about the element before the graphic element conversion to the converted graphic element and using the restoration information.

Figure 30:
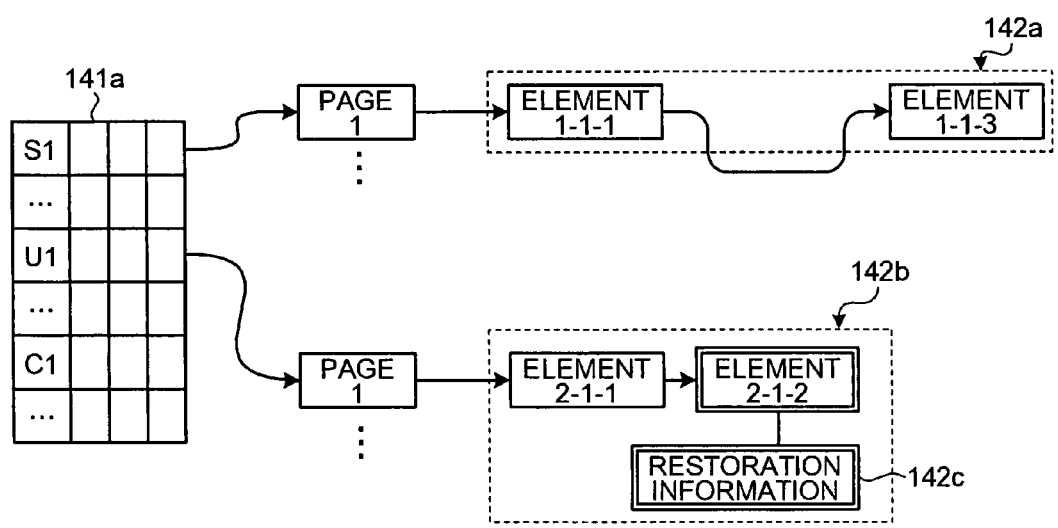
FIG. 30 is a schematic diagram of a data structure after converting an element to a graphic element by another method.

If using the method, as shown in FIG. 30, the element before the graphic element conversion (the element 1-1-2) is completely deleted after the graphic element conversion, and an element newly created by the graphic element conversion (the element 2-1-2) is added with restoration information 142c for restoring the element before the graphic element conversion. The restoration information 142c includes all attribution information kept in the element before graphic element conversion, in principle.

However, for example, as like in a case where the element before graphic element conversion is an electronic part, if part of attribution information can be obtained by referring to an external database, a key for referring to the electronic part, such as a product number, is included in the restoration information 142c.

Figure 31:
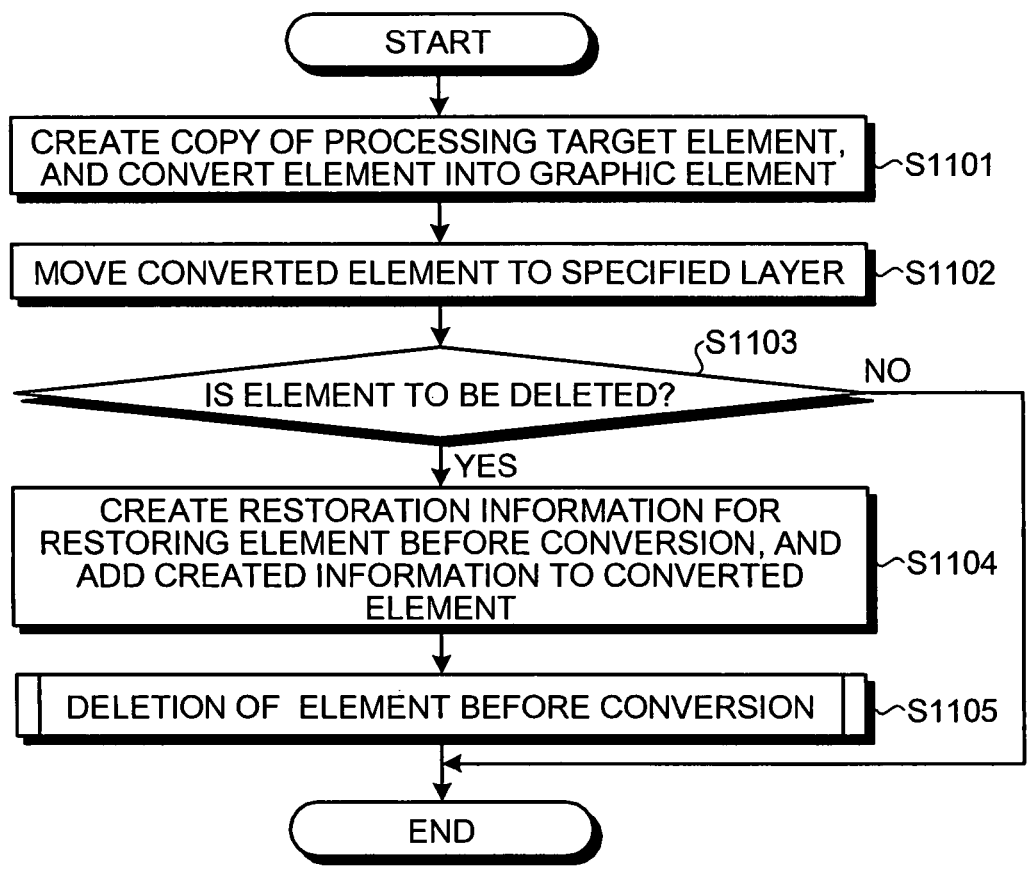
FIG. 31 is a flowchart of a process procedure for converting an element to a graphic element.

FIG. 31 is a flowchart of a process procedure for converting an element to a graphic element by using the method. As shown in the figure, when graphic element conversion of an element is instructed, the graphic-element converting unit 158a creates a copy of the element, and converts the element into a simple graphic element (step S1101). The converted element is then moved to a specified layer (step S1102).

If it is instructed such that the element before the graphic element conversion is to be deleted (Yes at step S1103), restoration information for restoring the element before the graphic element conversion is created, and added to the converted graphic element (step S1104), and the element deletion processing is executed and the element before the graphic element conversion is deleted (step S1105).

Figure 32:
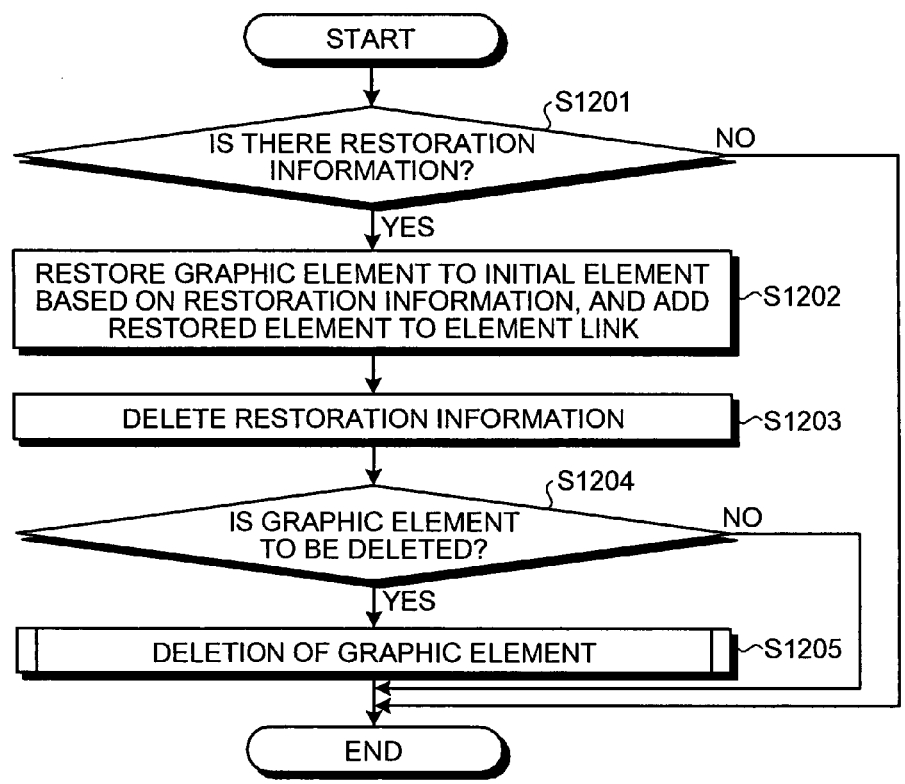
FIG. 32 is a flowchart of a process procedure of restoration processing of a converted graphic element.

FIG. 32 is a flowchart of a process procedure of restoration processing of an element by using the method. As shown in the figure, if a specified element is attached with restoration information (Yes at step S1201), the element restoring unit 158b restores the specified element to an initial element based on graphic information of the specified element and the attached restoration information, and adds the restored element to an initial element link (step S1202), and then deletes the restoration information, which is no longer used (step S1203).

If it is instructed such that the converted graphic element is to be deleted (Yes at step S1204), the element deletion processing is executed, and the converted graphic element is deleted (step S1205).

The configuration of the CAD apparatus 100 according to the embodiment as shown in FIG. 5 can be modified in various ways within a scope not departing from the scope of the present invention. For example, functions equivalent to the CAD apparatus 100 can be implemented by packaging a function of the control unit 150 in the CAD apparatus 100 as a software program and executing the program with a computer. An example of a computer that packages a function of the control unit 150 as a software program, and is configured to execute a CAD program 1071 is described below.

Figure 33:
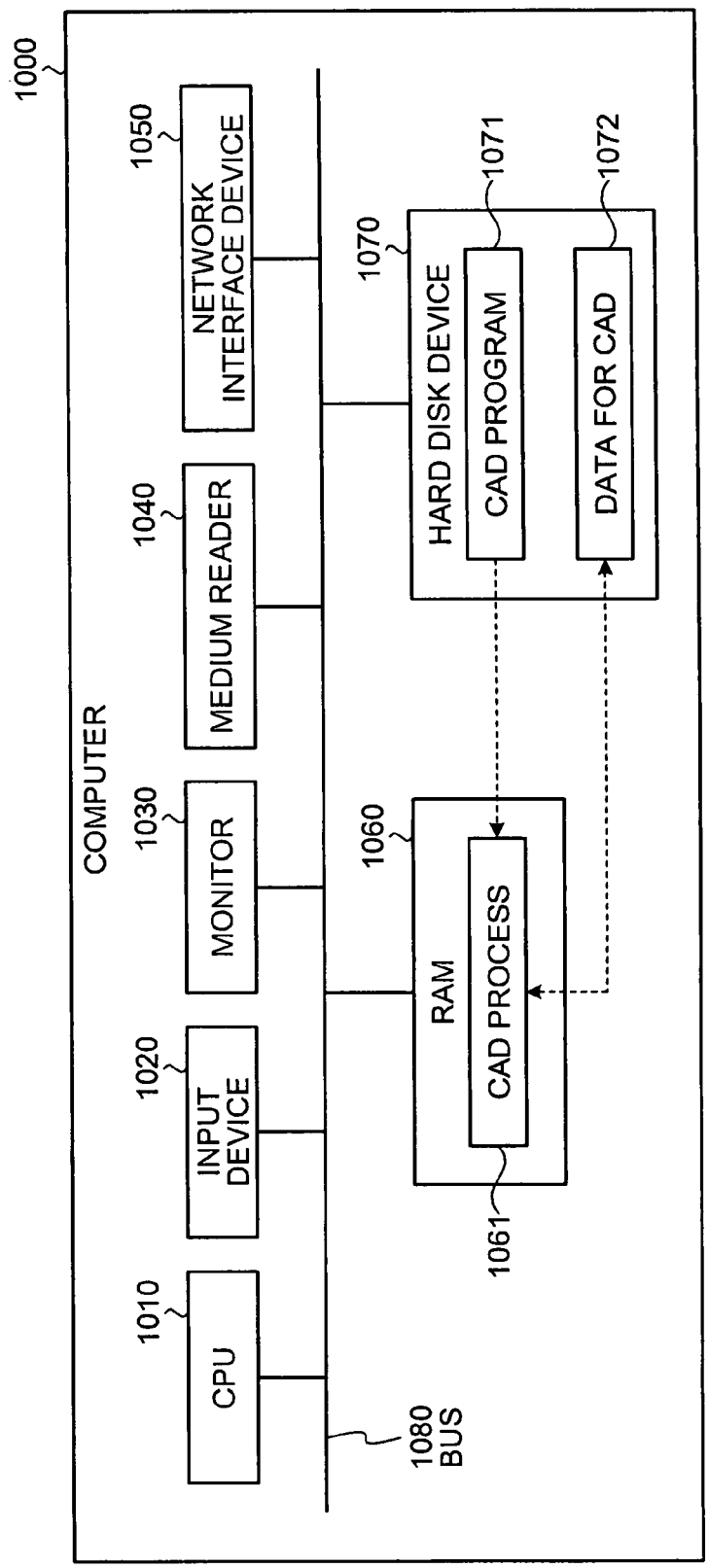
FIG. 33 is a functional block diagram of a computer that executes a CAD program.

FIG. 33 is a functional block diagram of a computer 1000 that executes the CAD program 1071. The computer 1000 includes a CPU (Central Processing Unit) 1010 that executes various computations, an input device 1020 that receives input of data from a user, a monitor 1030 that displays various information, a medium reader 1040 that reads a program or other information from a recording medium, a network interface device 1050 that exchanges data with other computers via a network, a RAM (Random Access Memory) 1060 that temporarily stores therein various information, and a hard disk device 1070, all of which are connected with a bus 1080.

The hard disk device 1070 stores therein the CAD program 1071 that has a function similar to the control unit 150 shown in FIG. 5, and data for CAD 1072 corresponding to various data stored in the storing unit 140 shown in FIG. 5. The data for CAD 1072 can be appropriately distributed and stored in other computers connected via the network.

As the CPU 1010 reads out the CAD program 1071 from the hard disk device 1070, and unarchives the program onto the RAM 1060, the CAD program 1071 turns to functions as a CAD process 1061. The CAD process 1061 appropriately unarchives information read out from the data for CAD 1072 into a region allocated on the RAM 1060 to the CAD process 1061, and executes various data processing based on the unarchived data.

The CAD program 1071 is not necessarily stored in the hard disk device 1070. It can be configured such that the computer 1000 reads out and executes the program stored in a recording medium such as a CD-ROM. Alternatively, another computer (or a server) connected to the computer 1000 via a public network, the Internet, a LAN (Local Area Network), a WAN (Wide Area Network), or the like, can store therein the program, and then the computer 1000 can read out the program from the connected computer and execute it.

According to an embodiment of the present invention, when the pointer is moved onto a displayed element, a CAD apparatus is configured to display information about a layer to which the element belongs, so that a user can easily find for what use the element belongs to the layer in use, thereby being able to perform required editing work immediately.

Moreover, according to an embodiment of the present invention, the CAD apparatus is configured capable to specify a layer including elements to be searched, so that only elements included in a layer used for a specific use are subjected to search, and the search can be efficiently performed.

Furthermore, according to an embodiment of the present invention, the CAD apparatus is configured capable to move and copy one or a plurality of elements between layers, so that editing work covering the layers can be efficiently performed.

According to the embodiments of the present invention, when the pointer is moved onto a displayed element, the CAD apparatus is configured to display information about a layer to which the element belongs, so that a user can easily find for what use the element belongs to the layer in use, thereby being able to perform required editing work immediately.

According to the embodiment of the present invention, the CAD apparatus is configured capable to specify a layer including elements to be searched, so that only elements included in a layer used for a specific use are subjected to search, and the search can be efficiently performed.

According to the embodiment of the present invention, the CAD apparatus is configured capable to move and copy one or a plurality of elements between layers, so that editing work covering the layers can be efficiently performed.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A CAD apparatus configured to display and edit graphic data including a plurality of layers, the CAD apparatus comprising:
a display unit having a display screen and configured to display elements included in each of the layers of the graphic data in a superposed manner on the display screen;
an input unit that at least receives an instruction about movement of a pointer indicating a position on the display screen;
an association-information storage unit that stores information about an association between the elements included in the layers of the graphic data; and
an editing unit that specifies each of the elements included in the layers of the graphic data and associates the elements included in the layers of the graphic data to each other in the superposed manner on the display screen by input from the input unit, the editing unit creating an association list that is stored in the association-information storage unit with associated restrictions on the elements being edited in a synchronized manner.

2. The CAD apparatus according to claim 1, wherein the editing unit performs operations including a delete, a copy, a move, and a highlighting display of any element.

3. The CAD apparatus according to claim 1, further comprising a setting information storage unit configured to permit a user to set and save a flag indicative of whether to enable the editing unit, and the CAD apparatus is configured to enable the editing unit when the flag is set so as to enable the editing unit.

4. The CAD apparatus according to claim 1, further comprising a confirming unit, invoked in a delete operation, to make a check with a user, before executing the editing unit, as to whether each of other elements of at least two linked elements should be deleted.

5. The CAD apparatus according to claim 1, further comprising a confirming unit which is invoked by a delete operation, to verify with a user whether one of at least two linked elements including an element of a default system layer should be deleted before executing the editing unit.

6. The CAD apparatus according to claim 1, further comprising a layer display unit invoked in the event that a cursor is operated to linger around a point at which a plurality of elements are located for a longer period of time than a predetermined period of time and configured to display an uppermost one of respective layers in which the plurality of elements are included.

7. A method of displaying and editing graphic data including a plurality of layers, the method comprising:
displaying elements included in each of the layers of the graphic data in a superposed manner on a display screen of a display unit;
receiving an instruction about movement of a pointer indicating a position on the display screen;
storing information about an association between the elements included in the layers of the graphic data; and
specifying each of the elements included in the layers of the graphic data and associating the elements included in the layers of the graphic data to each other in the superposed manner on the display screen by input from the input unit, the specifying creating an association list that is stored by the storing with associated restrictions on the elements being specified in a synchronized manner.

8. The method according to claim 7, wherein the specifying performs operations including a delete, a copy, a move, and a highlighting display of any element.

9. The method according to claim 7, further comprising permitting a user to send and save a flag indicative of whether to enable the specifying, and support of multi-layer is configured to enable the specifying when the flag is set so as to enable the specifying.

10. The method according to claim 7, further comprising confirming, when the executed specifying operation is a delete operation, and confirming, before executing the specifying, that each of other elements of at least two linked elements should be deleted.

11. The method according to claim 7, wherein the graphic data includes a first layer and a second layer, and the method further comprising copying at least one element included in the first layer to the second layer confirming, when the executed specifying operation is a delete operation, whether one of at least two linked elements including an element of a default system layer should be deleted before executing the delete operation.

12. The method according to claim 7, further comprising layer displaying, when a cursor is operated to linger around a point at which a plurality of elements are located for a longer period of time than a predetermined period of time, displaying an uppermost one of respective layers in which the plurality of elements is included.

13. A computer-readable recording medium that stores therein a computer program that causes a computer to display and edit graphic data including a plurality of layers, the computer program causing the computer to execute:
displaying elements included in each of the layers of the graphic data in a superposed manner on a display screen of a display unit;
receiving an instruction about movement of a pointer indicating a position on the display screen;
storing information about an association between the elements included in the layers of the graphic data; and
specifying each of the elements included in the layers of the graphic data and associating the elements included in the layers of the graphic data to each other in the superposed manner on the display screen by input from the input unit, the specifying creating an association list that is stored by the storing with associated restrictions on the elements being specified in a synchronized manner.

14. The computer-readable recording medium according to claim 13, wherein the specifying performs operations including a delete, a copy, a move, and a highlighting display of any element.

15. The computer-readable recording medium according to claim 13, wherein the computer program further causes the computer to execute permitting a user to send and save a flag indicative of whether to enable the specifying, and support of multi-layer is configured to enable the specifying when the flag is set so as to enable the specifying.

16. The computer-readable recording medium according to claim 13, wherein the computer program further causes the computer to execute confirming, when the executed specifying operation is a delete operation, and confirming, before executing the specifying, that each of other elements of at least two linked elements should be deleted.

17. The computer-readable recording medium according to claim 13, wherein the computer program further causes the computer to execute confirming, when the executed specifying operation is a delete operation, whether one of at least two linked elements including an element of a default system layer should be deleted before executing the delete operation.

18. The computer-readable recording medium according to claim 13, further comprises a layer displaying, when a cursor is operated to linger around a point at which a plurality of elements are located for a longer period of time than a prede termined period of time, displaying an uppermost one of respective layers in which the plurality of elements are included.

* * * * *